US 11,804,148 B2

(12) United States Patent
Macri et al.

(10) Patent No.: US 11,804,148 B2
(45) Date of Patent: *Oct. 31, 2023

(54) METHODS AND APPARATUSES FOR PRE-ACTION GAMING

(71) Applicants: Vincent John Macri, Tallahassee, FL (US); Vincent James Macri, Jackson, WY (US); Paul Zilber, Plainview, NY (US)

(72) Inventors: Vincent John Macri, Tallahassee, FL (US); Vincent James Macri, Jackson, WY (US); Paul Zilber, Plainview, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 16/151,042

(22) Filed: Oct. 3, 2018

(65) Prior Publication Data
US 2019/0103039 A1 Apr. 4, 2019
US 2023/0290274 A9 Sep. 14, 2023

Related U.S. Application Data

(63) Continuation of application No. 13/841,901, filed on Mar. 15, 2013, now Pat. No. 10,096,265.
(Continued)

(51) Int. Cl.
*G09B 23/28* (2006.01)
*G09B 19/00* (2006.01)

(52) U.S. Cl.
CPC ........... *G09B 23/28* (2013.01); *G09B 19/003* (2013.01)

(58) Field of Classification Search
CPC ...... G09B 23/28; G09B 19/003; G09B 23/30; G09B 23/32; G09B 1900/003
(Continued)

(56) References Cited

U.S. PATENT DOCUMENTS 5,078,152 A 1/1992 Bond et al.
5,429,140 A 7/1995 Burdea et al.
(Continued)

FOREIGN PATENT DOCUMENTS

JP 2002306632 A 10/2002
KR 20120137327 A 12/2012
(Continued)

OTHER PUBLICATIONS

Eng, K., et al., Interactive visuo-motor therapy system for stroke rehabilitation. Med Biol Eng Comput, 2007. 9 (Year: 2007).*
(Continued)

*Primary Examiner* — Timothy A Musselman
(74) *Attorney, Agent, or Firm* — RESOLUTE LEGAL PLLC

(57) ABSTRACT

Aspects of the disclosure include methods and apparatuses for pre-action gaming. For example, in an aspect, a method is presented for constructing a user-controllable image, comprising obtaining anatomical and physiological data associated with a body, storing the anatomical and physiological data in a database; and creating the user-controllable image based on the stored anatomical and physiological data, wherein the user-controllable image is configurable to a user, wherein at least a moveable portion of the user-controllable image is constructed to move based on input from a user, and wherein the user-controllable image is constructed so as to enable pre-action training the user. As such, victims of traumatic brain injury or other neurological setbacks may pre-train their nervous system for use of one or more injured body parts.

3 Claims, 16 Drawing Sheets

Related U.S. Application Data

(60) Provisional application No. 61/665,211, filed on Jun. 27, 2012.

(58) Field of Classification Search
USPC .......................................................... 434/262
See application file for complete search history.

(56) References Cited

U.S. PATENT DOCUMENTS

| | | |
|---|---|---|
| 5,554,033 A * | 9/1996 | Bizzi .................. A63B 24/0006 434/247 |
| 5,846,086 A | 12/1998 | Bizzi et al. |
| 5,984,880 A | 11/1999 | Lander et al. |
| 6,057,846 A | 5/2000 | Sever, Jr. |
| 6,098,458 A | 8/2000 | French et al. |
| 6,162,189 A | 12/2000 | Girone et al. |
| 6,164,973 A | 12/2000 | Macri et al. |
| 6,421,048 B1 | 7/2002 | Shih et al. |
| 6,666,831 B1 | 12/2003 | Edgerton et al. |
| 6,749,432 B2 | 6/2004 | French et al. |
| 6,827,579 B2 | 12/2004 | Burdea et al. |
| 6,834,169 B2 | 12/2004 | Hren et al. |
| 7,179,234 B2 | 2/2007 | Nashner |
| 7,252,644 B2 | 8/2007 | Dewald et al. |
| 7,460,125 B2 | 12/2008 | Yang et al. |
| 7,731,500 B2 | 6/2010 | Feygin et al. |
| 7,993,291 B2 | 8/2011 | Karkanias et al. |
| 8,214,029 B2 | 7/2012 | Koeneman et al. |
| 8,425,438 B2 | 4/2013 | Fujimoto et al. |
| 8,496,564 B2 | 7/2013 | Zlobinsky |
| 9,271,660 B2 | 3/2016 | Luo et al. |
| 9,326,909 B2 | 5/2016 | Liu et al. |
| 9,403,056 B2 | 8/2016 | Weinberg et al. |
| 9,483,622 B1 * | 11/2016 | Snyder ................ G06F 16/9535 |
| 10,380,910 B2 | 8/2019 | Wu et al. |
| 2002/0120362 A1 | 8/2002 | Lathan et al. |
| 2002/0146672 A1 | 10/2002 | Burdea et al. |
| 2004/0254771 A1 | 12/2004 | Riener et al. |
| 2004/0267320 A1 | 12/2004 | Taylor et al. |
| 2005/0250083 A1 | 11/2005 | Macri et al. |
| 2006/0074822 A1 | 4/2006 | Eda et al. |
| 2006/0084050 A1 | 4/2006 | Haluck |
| 2006/0287617 A1 | 12/2006 | Taub et al. |
| 2007/0016265 A1 | 1/2007 | Davoodi et al. |
| 2007/0048702 A1 | 3/2007 | Jang et al. |
| 2007/0066918 A1 | 3/2007 | Dewald et al. |
| 2007/0126733 A1 | 6/2007 | Yang et al. |
| 2008/0009771 A1 | 1/2008 | Perry et al. |
| 2008/0132383 A1 | 6/2008 | Einav et al. |
| 2009/0221928 A1 | 9/2009 | Einav et al. |
| 2009/0259148 A1 | 10/2009 | Willmann et al. |
| 2009/0326341 A1 | 12/2009 | Furlan |
| 2011/0009241 A1 * | 1/2011 | Lane .................. A63B 24/0087 482/8 |
| 2011/0054870 A1 | 3/2011 | Dariush et al. |
| 2012/0004579 A1 * | 1/2012 | Luo ........................ G16H 50/50 600/595 |
| 2012/0021394 A1 * | 1/2012 | deCharms ............. A61B 5/4094 434/262 |
| 2012/0077163 A1 | 3/2012 | Sucar Succar et al. |
| 2012/0108909 A1 | 5/2012 | Slobounov et al. |
| 2012/0142416 A1 | 6/2012 | Joultras |
| 2012/0157263 A1 | 6/2012 | Sivak et al. |
| 2013/0035734 A1 | 2/2013 | Soler Fernandez et al. |
| 2013/0046206 A1 | 2/2013 | Preminger |
| 2013/0072353 A1 | 3/2013 | Alessandri et al. |
| 2013/0096940 A1 | 4/2013 | Hayes |
| 2013/0123667 A1 | 5/2013 | Komatireddy et al. |
| 2013/0138011 A1 | 5/2013 | Ang et al. |
| 2013/0171596 A1 | 7/2013 | French |
| 2013/0252216 A1 | 9/2013 | Clavin et al. |
| 2013/0316316 A1 | 11/2013 | Flavell et al. |
| 2013/0342527 A1 * | 12/2013 | Molyneaux ........... G06V 20/653 345/419 |
| 2014/0004493 A1 | 1/2014 | Macri et al. |
| 2014/0031098 A1 | 1/2014 | Tacconi |
| 2014/0147820 A1 | 5/2014 | Snow et al. |
| 2014/0287876 A1 | 9/2014 | Etter et al. |
| 2014/0364230 A1 | 12/2014 | Borghese et al. |
| 2014/0371633 A1 | 12/2014 | Evin et al. |
| 2015/0196800 A1 | 7/2015 | Macri et al. |
| 2015/0202492 A1 | 7/2015 | Domansky et al. |
| 2016/0082319 A1 | 3/2016 | Macri et al. |
| 2016/0086500 A1 | 3/2016 | Kaleal, III |
| 2016/0129343 A1 | 5/2016 | Domansky et al. |
| 2016/0213978 A1 | 7/2016 | Ban et al. |
| 2016/0235323 A1 | 8/2016 | Tadi et al. |
| 2017/0209737 A1 | 7/2017 | Tadi et al. |
| 2017/0325719 A1 | 11/2017 | Courtine et al. |
| 2018/0184948 A1 | 7/2018 | Tadi et al. |
| 2018/0214768 A1 | 8/2018 | Marcri et al. |
| 2018/0228430 A1 | 8/2018 | Perez Marcos et al. |
| 2018/0229081 A1 | 8/2018 | Yi et al. |
| 2018/0239430 A1 | 8/2018 | Tadi et al. |
| 2018/0239956 A1 | 8/2018 | Tadi et al. |
| 2018/0240261 A1 | 8/2018 | Tadi et al. |
| 2018/0262744 A1 | 9/2018 | Tadi et al. |
| 2018/0275760 A1 | 9/2018 | Nicolet et al. |
| 2018/0275766 A1 | 9/2018 | Condolo |
| 2018/0336973 A1 | 11/2018 | Tadi et al. |
| 2019/0009133 A1 | 1/2019 | Mettler May |
| 2019/0025919 A1 | 1/2019 | Tadi et al. |
| 2019/0336381 A1 | 11/2019 | Koltzi et al. |
| 2022/0338761 A1 | 10/2022 | Maddahi et al. |

FOREIGN PATENT DOCUMENTS

| | | |
|---|---|---|
| WO | 2011123059 A1 | 10/2011 |
| WO | 2012161657 A1 | 11/2012 |
| WO | 2013136287 A1 | 9/2013 |
| WO | 2014/154839 A1 | 10/2014 |
| WO | 2016/081830 A1 | 5/2016 |
| WO | 2018/134686 A3 | 7/2018 |
| WO | 2018/142228 A2 | 8/2018 |
| WO | 2018/146546 A1 | 8/2018 |
| WO | 2018/146558 A3 | 8/2018 |
| WO | 2019016811 A1 | 1/2019 |

OTHER PUBLICATIONS

Pyk P, Wille DA, Chevrier E, Hauser Y, Holper L, Fatton I, et al. A paediatric interactive therapy system for upper limb motor rehabilitation. In: 2008 6th FENS (the Federation of European Neuroscience Societies) Forum of Neuroscience, 127-132 (Year: 2008).*

Macri et al., "Repairing Brain-Motor Disability," International ABI Clinical Study Czech Republic Poster, (c)2015, 1 page.

International Search Report dated Oct. 14, 2014, International Application No. PCT/US2014/038447, pp. 1-4.

Lebedev M.A., et al., "Brain-Machine Interfaces: Past, Present and Future" Trends in Neurosciences vol. 29, No. 9, Sep. 2006, pp. 536-546.

Ultraleap," Leap Motion Developer", Retrieved from the Internet on Aug. 5, 2020: https://developer.leapmotion.com/documentation, pp. 1-14.

Biospace, "Robotic Stroke Therapy Devices from Kinetic Muscles Inc. to be Marketed Internationally", Mar. 23, 2010, Retrieved from the Internet: https://www.biospace.com/article/releases/robotic-stroke-therapy-devices-from-b-kinetic-muscles-inc-b-to-be-marketed-internationally-/, pp. 1-3.

Jeffrey Rogers et al., "Elements virtual rehabilitation improves motor, cognitive, and functional outcomes in adult stroke: evidence from a randomized controlled pilot study",Journal of NeroEngineering and Rehabilitation, vol. 16, No. 56, 2019, pp. 1-13.

Neofect, Retrieved from the Internet Apr. 2020: https://www.neofect.com/en/product/stroke-therapy-hand/, pp. 1-9.

Ayca Utkan Karasu et al., "Effectiveness of Wii-based rehabilitation in stroke: A randomized controlled study", Journal of Rehabilitation Medicine, vol. 50, No. 5, May 2018, pp. 406-412.

(56) References Cited

OTHER PUBLICATIONS

Jintronix, Retrieved from the Internet Apr. 2020: http://www.jintronix.com/, pp. 1-18.
Virtualis, "Functional Rehabilitation", Retrieved from the Internet Apr. 2020: https://virtualisvr.com/en/functional-rehabilitation/, pp. 1-20.
XRhealth, Retrieved from the Internet Apr. 2020: https://www.xr.health/, pp. 1-13.
Constant Therapy, Retrieved from the Internet Apr. 2020: https://thelearningcorp.com/constant-therapy/, pp. 1-7.
Bioness, Retrieved from the Internet Apr. 2020: https://www.bioness.com/BITS.php, pp. 1-3.
TRC, Retrieved from the Internet Apr. 2020: https://www.trcare.net/product, pp. 1-3.
Bertec, "Prime IVR", Retrieved from the Internet Apr. 2020: https://www.bertec.com/products/prime-ivr, pp. 1-9.
Rehab-Robotics, Retrieved from the Internet Apr. 2020: http://www.rehab-robotics.com.hk/hoh/index.html, p. 1.
Myomo, Retrieved from the Internet Apr. 2020: https://myomo.com/what-is-a-myopro-orthosis/, p. 1-6.
Kinetec, "Continuous Passive Motion", Retrieved from the Internet Apr. 2020: https://kinetecuk.com/categories/continuous-passive-motion, p. 1-4.
Chattanooga Rehab, Retrieved from the Internet Apr. 2020: https://www.chattanoogarehab.com/us/, pp. 1-9.
Daiya, "Power Assist Glove", Retrieved from the Internet Apr. 2020: https://www.daiyak.co.jp/en/product/detail/280?k=assist+glove&s=0, p. 1-6.
Neofect, "Neomano", Retrieved from the Internet Apr. 2020: https://www.neofect.com/us/neomano, pp. 1-13.
The Medcom Group, Ltd, "QAL Medical 6000X WaveFlex Hand CPM", Retrieved from the Internet Apr. 2020: https://www.medcomgroup.com/qal-medical-6000x-waveflex-hand-cpm/, pp. 1-7.
Extended European Search Report dated Jul. 9, 2020, European Patent Application No. 19207843.4, pp. 1-9.
PCT International Search Report and Written Opinion dated Dec. 17, 2021, International Application No. PCT/US2021/48436, pp. 1-8.

* cited by examiner

METHODS AND APPARATUSES FOR PRE-ACTION GAMING

CLAIM OF PRIORITY

The present application is a continuation of U.S. patent application Ser. No. 13/841,901, filed Mar. 15, 2013, which claims priority under 35 U.S.C. § 119 to U.S. Provisional Application No. 61/665,211, entitled "Methods and Apparatus for Pre-Action Gaming," and filed on Jun. 27, 2012, both of which are incorporated herein by reference.

TECHNICAL FIELD

Embodiments pertain to the field of user self-teaching pre-action gaming simulations, synonymously, pre-action training, pre-action exercise, or instantiating kinetic imagery in virtual environments. The present disclosure further relates to constructing, configuring, or controlling user controllable images as used in pre-action training. The present disclosure further relates to methods and apparatus that provide for user pre-action training control of non-virtual prostheses, exoskeleton body parts, robots or other motile or audiovisual devices.

The broad medical problem is that while training simulations are ubiquitous, including extensive use for training health care providers, the individuals most in need in of care e.g. patients, survivors and other health-affected individuals (synonymously "users") have few, if any, simulations tailored to their needs and none in said field. Said users' goals may include regaining or improving processes that enable performing activities of unaffected living after, without limitation: neurological injury or condition resulting from penetrating or non-penetrating insult injury or stress; or physical injury due to invasive or non-invasive causation; or experiencing psychological or neurochemical disorder. The economic problem is that said users undergo long-term and costly therapeutic and rehabilitative procedures therefore consuming significant healthcare services and costs without recourse to heuristic health improvement methods and apparatuses. The access-to-care problem is that when affected by an injury, condition, or disorder, there are insufficient methods and apparatuses to activate needed brain processes, or to stimulate, much less repeatedly stimulate, without limitation, neurons, neurological support cells, inter-neuron communications, gray and white matter cortical circuitry, other brain circuits or communications or tissues or proteins of the brain or central nervous system. The user's more particular medical, therapeutic, and rehabilitative care problems are to use said method and apparatus at least to improve the neurological, physical, or psychological conditions noted above.

Further, the said user's medical therapeutic and rehabilitative care problems are access to diagnoses or measurements or biomarkers of brain processes or activations, or determinations of amounts or levels of biological substances, without limitation, tau proteins. One solution to said users' problems in preparing for real-world physical actions is to use methods and apparatuses for pre-action control of user-controllable images that enable user pre-action training control of non-virtual robotic, prosthetic, and exoskeleton objects. One objective is to provide a method and apparatus enabling said user to instantiate kinetic imagery using simulations i.e. to transition from personal mental images or visualizations of physical actions into instantiations of simulated physical actions, synonymously, "viewable embodiments of cortical simulations of physical actions." One technical problem therefore is to construct user controllable images that are anatomically realistic, have analogous true range of motion, are user controllable to simulate physical actions on any display screen and thereby to provide said user with stimulating virtual alternatives to actual physical action feedback. The applicants' self-training gaming simulations-improvement problem is to measure or ascertain brain activity and biological substances and, based on that information, to improve said pre-action gaming simulations to enhance user objectives or improve user conditions.

BACKGROUND

The present invention enables negatively health-affected individuals e.g. said users, synonymously, "plurality of users," to use self-controlled and/or directed pre-action training simulations to stimulate brain structures and processes. Operationally, said user controls virtual body parts that are anatomically realistic with analogous true range of motion to simulate physical actions, thereby engaging in pre-action gaming simulations. Said invention enables said user to repeat brain stimulation in part through interactive instantiation of kinetic imagery, synonymously, "viewable embodiments of cortical simulations of physical actions." The invention is directed without limitation to individuals affected by stroke, traumatic brain injury, focal dystonias, chronic traumatic encephalopathy, amputees, joint replacement patients, or other conditions in need of physical, occupational or psychological rehabilitation/therapy, without limitation, brain tumors, cerebral palsy, Parkinson's disease, autism spectrum disorders, schizophrenia, phobias, other acquired brain injuries ("ABI"), or other medical deficits, disorders or diseases.

Further operationally, before or without being able to perform physical action(s), said user executes inputs (using any input device e.g. without limitation a computer mouse, touch-screen, head or eye actions or wireless signals) that control/direct simulated physical actions of on-screen images. Said user's physical method of inputs is physically non-corresponding to displayed actions of on-screen images. Said inputs control virtual body parts, synonymously, "the entire body," whether clothed, skin-covered, or exposed, displayed in any virtual environment. Said user inputs may simultaneously or sequentially control single or multiple virtual body parts.

Physiologically, the user's challenge is to initiate or improve physical or related cognitive actions before or without being able to perform or practice said actions. The present invention can be used for self-teaching, without limitation: a) brain processes to enable performing new actions or improve past actions e.g. to help stroke or traumatic brain injury or chronic traumatic encephalopathy patients; or b) potentiation of brain processes to replace or supplement damaged neural circuits e.g. help joint-replacement patients regain abilities; or c) de-activation of existing neuromuscular actions, e.g. to decrease or stop users' uncontrolled muscle contractions as in focal cervical dystonia; or d) de-sensitization of damaged neural circuits e.g. phantom limb or other painful body parts; or e) creation of brain processes to supplant dysfunctional/debilitating experiences e.g. suffering from phobias, schizophrenic hallucinations or autism spectrum sensory-action disorders.

For individuals with disabled or dysfunctional use of body parts or with psychological conditions impeding control of actions or related cognitive processes, imagined action alone results in imagined feedback. Visualization and imagery alone, e.g. without creating pre-action simulations, are only somewhat sufficient for rehabilitating action planning or execution or restoration of unaffected physical actions or related cognitive processes. The present invention provides video game-like, opportunities so that said user is able to transition from mere visualization to external feedback generation, i.e. to instantiate abstract mental representations of physical actions into actual visual displays of simulated physical actions, synonymously, "viewable embodiments of cortical simulations of physical actions."

Existing theories hold that repeated stimulation of neurological receptors may form "cell assemblies" and that there are beneficial mathematical relationships between outcomes of repeated firing of interconnected neurological cells and learned behavior. Using the present invention at least includes and provides for repeated, self-induced neurological stimulation and self-teaching, including interactive instantiation of kinetic imagery.

Using the present invention, the user may attempt to create simulated physical actions and may succeed in doing so. Consequently, the user's planning processes for anticipated and intended physical actions and related cognitive processes are activated. This activation may be followed by controlling and/or directing desired, purposeful, simulated actions. Basically, the user anticipates or intends to originate or otherwise cause simulated physical actions and knows the meaning of such actions. Using the methods and/or apparatuses of the present invention, which include utilizing or creating instantiated kinetic imagery feedback, may help to illustrate and reinforce what the user planned to do and actually did. Repetition makes it possible to do that better.

SUMMARY

The following presents a simplified summary of one or more aspects of the present disclosure in order to provide a basic understanding of such aspects. This summary is not an extensive overview of all contemplated aspects, and is intended neither to identify key or critical elements of all aspects nor to delineate the scope of any or all aspects. Its sole purpose is to present some concepts of one or more aspects in a simplified form as a prelude to the more detailed description that is presented later.

The one or more users of the present invention are able to transition from conscious imagery/visualization, in effect abstract mental processes, to real visuomotor feedback. Accordingly, for said affected conditions, injuries, disorders or experiences, or for any user who is challenged, the present invention enables instantiation of kinetic imagery, i.e. "viewable embodiments of cortical simulations of physical actions" resulting in feedback that is next-best to actual physical action feedback for self-teaching, self-re-learning, self-re-exercising physical actions or skills or related cognitive processes or self-therapy-rehabilitation.

Aspects of the present invention relate to methods and apparatuses for instantiating kinetic imagery. More particularly, the invention includes instantiating kinetic imagery by a user controlling virtual body parts alone or in conjunction with virtual objects. In an aspect, a user may engage in one or more self-teaching virtual training games, i.e. Pre-action Exercise Games ("PEGs"). PEGs provide users with stimulating substitutes for actual physical action feedback. Said feedback fosters stimulation aspects of any user's brain previously compromised due to any of the conditions or disorders listed in this disclosure or other conditions that may be within the scope of this disclosure. PEGs provide simulated physical action feedback from user controlled/directed virtual body parts corresponding or non-corresponding to the user's body part(s) that may have suffered reduced or lost functionality. Said user, controlling virtual world actions, is engaged in virtual training for real-world actions. In an additional aspect, PEGs provide a user with a neuronal workout that stimulates without limitation neuronal recruitment, synaptogenesis or brain plasticity, functions or processes.

PEGs provide a link between kinetic visualization/imagery and user originated-controlled/directed simulated physical actions. Visualization and imagery of physical action is an integral step in motor planning, physical performance or reacquisition of purposeful physical actions that have been compromised. The methods and apparatuses described herein implement kinetic imagery by providing each user with means to 'act out' or otherwise control virtual body parts so that the simulated actions of body parts represent instantiated, real visual displays of a user's abstract processes of visualization/imagery.

The present disclosure further relates to constructing, configuring, and/or controlling user controllable images, such as those used in pre-action training. According to aspects of the present disclosure, presented is a method of constructing a user-controllable image, which includes obtaining anatomical and physiological data associated with a model of the body, storing said data in a database, and creating the user-controllable image based on said body model data, wherein the user-controllable image may be configurable to a user, wherein at least a moveable portion of the user-controllable image is constructed to move based on input controls from a user, and wherein the user-controllable image is constructed so as to enable pre-action self-training by a user. In an additional aspect, demonstrative actions of the user-controllable image or any image(s) can be generated by using motion capture or other technologies. In an additional aspect, motion capture or other technologies can likewise be used to construct and/or configure a user controllable image.

In an additional aspect, presented herein is a method of configuring a user-controllable image to a user, which includes obtaining at least one default parameter associated with the user-controllable image, obtaining at least one user parameter associated with a user body, comparing the at least one default parameter and the at least one user parameter, constructing a user-configured, user-controllable image by adjusting one or more of the at least one default parameter where the at least one user parameter differs from the at least one default parameter, wherein the user-configured, user-controllable image is configured so as to enable pre-action self-training by a user, and providing the user-configured, user-controllable image to the user for pre-action training. In an additional aspect, motion capture or other technologies can likewise be used to configure a user-controllable image ("UCI").

The present disclosure further provides an example method of controlling a user-controllable image, which includes providing a virtual body part to a user, wherein the user-controllable image comprises the virtual body part, receiving a selection input or multiple selection inputs from the user, wherein said selection input(s) is associated with at least a portion of one or more virtual body parts, receiving an action input from the user, and displaying an action of the at least a portion of the virtual body part based on the action input, wherein the displayed action is physically non-corresponding to the action input and wherein the selection input(s) and action input(s) are at least a part of pre-action self-training by a user. In addition, the present disclosure contemplates without limitation apparatuses, computers, computer readable media, hand-held devices, computer program products, internet accessibility, multi-user use and means for performing these said example methods.

The present disclosure further relates to methods and apparatuses that provide for user pre-action control of non-virtual prostheses, exoskeleton body parts, robots or other motile or audiovisual devices, synonymously, "at least one non-virtual object." This disclosure provides an example method for controlling a UCI representing said at least one non-virtual object. It includes providing a virtual representation of a non-virtual object to a user, wherein said representation of a non-virtual object receives a selection input(s) from the user, wherein the selection input is associated with at least a portion of the non-virtual object, wherein receiving an action(s) input from the user, and displaying, approximately simultaneously, said virtual action and a physical action of the at least a portion of the non-virtual object and based on the action input, wherein the said virtual and physical actions are physically non-corresponding to the action input and wherein the selection input and action input are at least a part of pre-action training a user to use a non-virtual object.

Further aspects of the present invention relate to using PEGs for medical diagnostic purposes or measuring brain processes and biological substances, or biomarkers, to improve PEGs. In such further aspects a health-affected user, using PEGs, simultaneously has brain processes and biological substances assessed or measured, then compared to a baseline of control non-health-affected users who have used or are using PEGs.

Further aspects of the present invention relate to healthcare or research professionals learning or researching "what-ifs" relating to any of the conditions to which this invention is applicable.

The methods and apparatuses of the present disclosure may be non-invasive, solo video game-like, heuristic, economical and useable on any computer or other digital device, practically anywhere and at any time. The present invention has the potential to leverage users' rehabilitation or therapists' productivity to high levels. It is well-suited to hands-on or telemedicine healthcare services.

To the accomplishment of the foregoing and related ends, the one or more aspects comprise the features hereinafter fully described and particularly pointed out in the claims. The detailed description of the invention and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
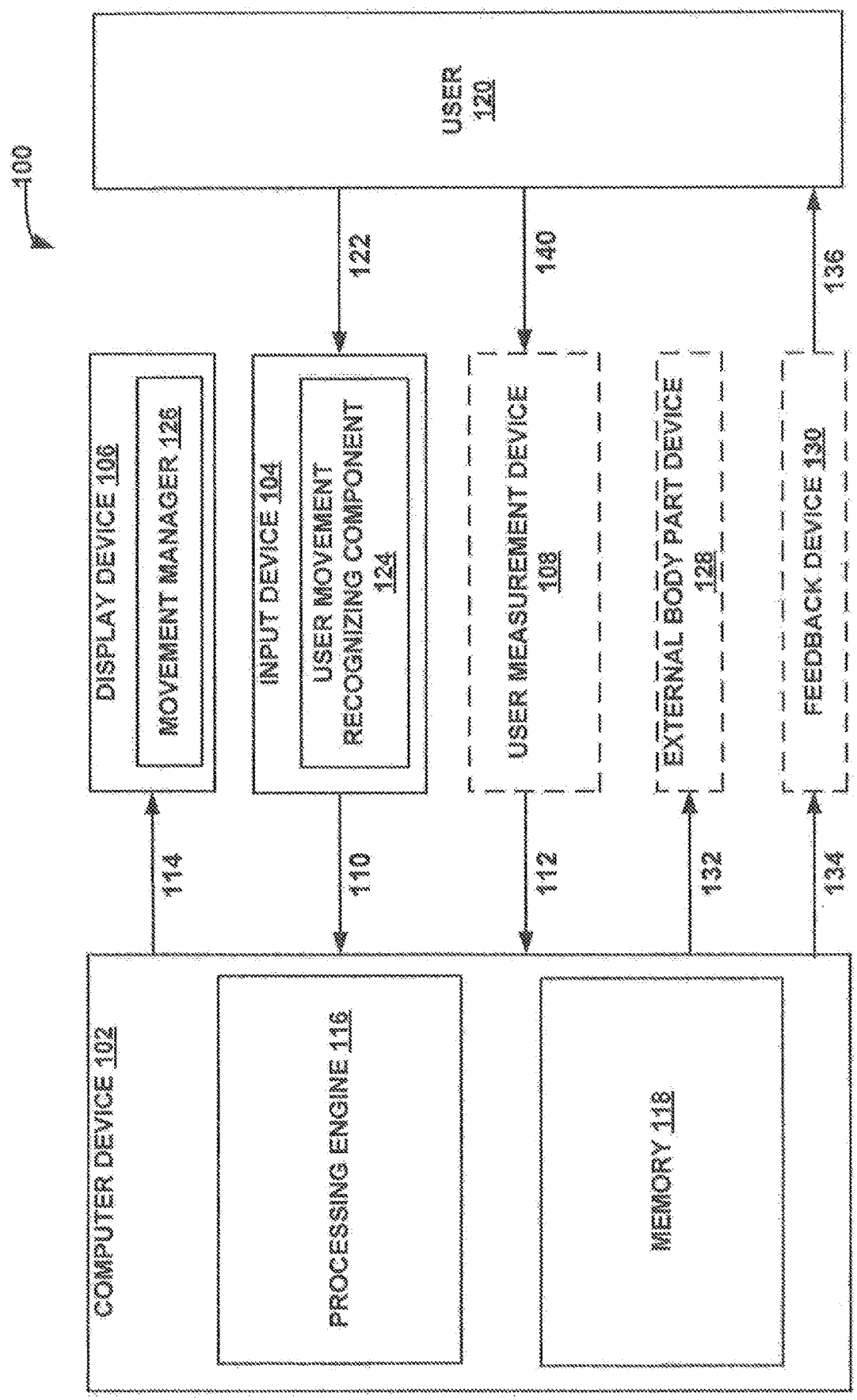
FIG. 1 is a system-level component diagram illustrating a system for pre-action training according to aspects of the present disclosure.

Purposeful and reflexive physical actions of body parts are proximally derived from neuronal signaling (spinal cord outputs) to muscles. However, pre-action planning for purposeful actions is derived from neuronal signaling (outputs) of brain structures or processes initiating the neural signaling of the spinal cord. Brain communications are essential to initiating purposeful new physical actions or to regaining ability to perform said physical actions or related cognitive processes or to correct physical, neurological or psychological actions associated with disorders or conditions.

The damaged brain, no less than other damaged body parts, requires therapy or rehabilitation. PEGs were and continue to be designed and used to stimulate pre-action planning processes for brain therapy or rehabilitation. No known technologies, other than those disclosed in this disclosure are directed to pre-action planning, training, or exercises in virtual environments. None are known to enable users to instantiate kinetic imageries of physical actions in any virtual environment i.e. to originate or create viewable embodiments of cortical simulations of physical actions.

Acquired brain injury ("ABI"), including stroke, chronic traumatic encephalopathy, and traumatic brain injury ("TBI"), survivors or without limitation individuals affected by any condition, disorder, or experience noted in this disclosure, may sustain impaired or eradicated use of one or more body parts. The result is formation of mild to severe barriers to physically controlling one's actions. The barriers exist despite, in many instances, body parts being totally or somewhat uninjured. For ABI survivors it is fair to say that except for the brain injury (and consequential atrophy) chronic physical action deficits would not require rehabilitation. To address said deficits ABI survivors undergo long-term and costly therapeutic and rehabilitative procedures. These are major healthcare services or cost problems. Epidemiologically, and by way of example, the combined, annual incidence of ABI, stroke and traumatic brain injury ("TBI") alone, in the United States leaves 2.5 million survivors annually. A broader category, neurotrauma (penetrating and non-penetrating), including primary brain tumor, focal dystonias, limb apraxia/ataxia, cerebral palsy and amputations, affects more than 12 million U.S. civilians and approximately 200,000-400,000 combat veterans. Assuming that the incidence of ABI/TBI alone is generally uniform worldwide, by extrapolation the total number of ABI/TBI survivors worldwide would exceed 50 million individuals. The total number of neurotrauma survivors worldwide would therefore exceed 275 million individuals, which represents a number approximating the entire U.S. population.

Conventional rehabilitation/therapies for treating ABIs are primarily physical in nature involving assisted and independent efforts to restore survivors to being able to make unaffected physical actions. Physical and occupational therapy actions are characterized in that the movements of survivors' body parts correspond to intended unaffected movements. For example, when a user recovering from a stroke or TBI undergoes rehabilitation to regain proper axial movement of the user's arm at the shoulder, the user with or without assistance repeatedly attempts to move (or have moved with professional or mechanical assistance) her/his arm in the axial direction. Those movements are to promote recovery according to conventional therapy or rehabilitation emphasizing corresponding movements. That recovery process is predominantly outside-in. In contrast, the processes of the present invention are inside-out. Methods and apparatuses for pre-action training target brain structures or processes, i.e. a principal pathological site for ABI/TBI survivors or other affected individuals.

Making corresponding physical training movements are variably effective, but difficult or impossible for those recovering from ABI/TBI or other conditions or disorders noted above. From the survivors' perspective, the challenge and question are how to practice physical actions or train to move without being able to move. ABI/TBI survivors are left with disconnections between, on one hand, intact, and in many cases, initially uninjured body parts and on the other hand, dysfunctional brain processes required for planning the movements of such body parts. In some cases, patients' and survivors' difficulties are magnified due to the individual's non-awareness of the existence of an unusable body part. One challenge for ABI/TBI survivors is to regain the use of body parts. That challenge is addressed by using the present invention to control virtual body parts so as to make simulated actions before, during, after or adjunctive to utilizing physical or assistive rehabilitation or therapeutic methods that use corresponding physical actions by such body parts. Thus to regain full and expeditious control of using ABI/TBI-affected body parts the present methods and apparatuses are needed for providing pre-action training.

Conventionally for ABI, at least one of three therapies is used. They are, motor imagery; mirror therapy; and action-observation therapy. Motor imagery involves imagining motor controls and attempting to physically exercise the resulting imagery. Mirror therapy has been used for amputees experiencing phantom limb pain. It involves using an intact body part to make physical actions reflected in a physical mirror. The mirrored actions appear to be made by the contralateral (amputated) body part. The patient's observation of said actions has been shown to decrease or terminate phantom limb pain Action-observation therapy is theoretically mirror neuron based and involves viewing physical actions followed by the patient's efforts to match i.e. imitate the observed actions. None of the foregoing therapies are video game-like in terms of interactivity, immersion, scope, versatility, heuristic teaching methodology, economy, or entertainment. None enable patients to instantiate kinetic imagery as does the present invention. The present invention, unlike current therapies or rehabilitation techniques enables individuals, in a video game-like virtual environment, to independently make inputs that interactively control virtual body parts. By personally causing simulated physical actions to be displayed, said individuals produce real visuomotor (visuoaction) feedback from said simulated actions and induce new or augmented brain processes.

Humans excel at creating mental imagery. Imagery and simulation occur while conscious or during dreams. Conscious, imagined actions precede and are fundamental to making purposeful physical actions. Making repeated physical actions, accompanied by feedback acquired from such actions, results in improved action skills. For unaffected individuals, the process of creating productive feedback evolves from mental abstractions to making actual physical actions in the real world and receiving feedback via sensory-action return signals. That process is variably unavailable or impossible for many individuals affected by the aforementioned conditions. However, for said affected individuals the present invention may be used to create productive action feedback directed to improving action planning or regaining physical actions for daily living.

Aspects of the present invention relate to methods and apparatuses for pre-action training, also disclosed as pre-action training for ABI/TBI survivors. The term ABI/TBI survivors in this disclosure includes without limitation other conditions and disorders disclosed in this disclosure and others to which pre-action training may be useful. More particularly, the invention is for pre-action training by ABI/TBI survivors using virtual body parts. In an aspect, a user, who may be an ABI/TBI survivor, may engage in one or more Pre-Action Exercise Games ("PEGs"). PEGs provide ABI/TBI survivors with brain stimulating substitutes for actual physical-action feedback. Said PEGs feedback fosters the user's restoration of pre-action brain processing, such as those parts of the brain previously compromised due to the ABI/TBI. PEGs provide simulated physical-action feedback from user-originated physical simulations via controlled/directed, virtual body parts corresponding to at least the user's body parts that suffered reduced or lost functionality as the result of ABI or TBI. Such survivor controlled/directed, virtual body parts are caused by the user to simulate physical actions thereby executing virtual-world actions as pre-action training for real world actions. In an additional aspect, PEGs provide the ABI/TBI survivor with a pre-action training workout that stimulates without limitation neuronal recruitment, inter-neuron communication synaptogenesis and brain plasticity.

PEGs provide a link between kinetic imagery/visualization and user-originated simulated physical actions. Imagery/visualization of physical actions is integral to action planning, physical performance, and reacquisition of physical actions or skills. The methods and apparatuses described herein support kinetic visualization and imagery by providing each user with means to 'act out' or otherwise control virtual body parts so that the body parts represent real visual instantiations of a user's abstract processes of imagery/visualization.

PEGs are without limitation exercises used in pre-action control/direction of virtual body parts to simulate physical action intentions and at least to receive feedback for neuro-rehabilitation of action-planning processes.

According to aspects of the present disclosure, interaction with virtual body parts, links any user's cognition, visualization, or imagery to virtual action feedback. Furthermore, the methods and apparatuses described herein can engage ABI/TBI survivors to self-teach action planning for purposeful physical actions.

According to aspects of the present disclosure, an ABI/TBI survivor may target and help overcome her/his action deficits by making inputs to a system that displays a user-controllable virtual body part, thereby directing and causing simulated actions of a moveable region of the virtual body part based on the inputs, viewing feedback from such simulated actions and building new and/or re-building impaired neurological or brain processes According to the present disclosure, any user may control and direct virtual body part(s) to display simulated, human physical actions with virtual full range of motion. The user may control a virtual body part to speed up, slow down, stop or make any combination of said actions or gradations of same. System displays of virtual body part actions may be idiosyncratic representations of each survivor's input controls and direction. In effect, the user's virtual body part control process stimulates cognitive processes and pre-action-trains for real action processes.

Furthermore, the methods and apparatuses presented herein differ from modern gaming systems like Wii™ and Kinect™ that are being used for physical and occupational rehabilitation. Said systems require their users to make actual physical actions that are then displayed in virtual environments. Therefore, by design, Wii™ and Kinect™ users make actual physical actions that correspond to displayed actions. Conversely, the methods and apparatuses presented herein eliminate the requirement of user performance of corresponding physical actions to what are then displayed as simulated physical actions. For example a user of the present invention can make small or limited non-corresponding eye and/or head gestures carried by webcam signals, and wirelessly transmit brain signals, to control the simulated actions of virtual body parts. In but one example, any user's input signals by eye controls (alone) can direct a virtual shoulder to move an arm 90 degrees away from the body. Accordingly, a user's input signaling processes associated with the present invention are non-corresponding, that is to say a user's physical method of input, e.g. eye, mouse or wireless brain signal, does not correspond to the simulated actions of the virtual body parts of the present disclosure.

The inputs (controls and directions) described herein are dissociated from displayed virtual-image actions and allow ABI/TBI survivors to cause simulated physical actions (action processes) before and without performing real physical training action processes. Each user's inputs according to the present disclosure are not physical-training action movements of the desired drill or skill. Rather, the present methods and apparatuses target without limitation neuronal systems, brain structures, gray and white matter circuitry, neurogenesis, synaptogenesis, myelination, brain plasticity, and cognitive processes, not any particular physical-action inputs or outputs.

Physical training participation, due to its repetitive aspects, can be tedious and hindered by boredom. Participation in physical training is also fraught with new injury or aggravating old injury. PEGs provide entertaining, rewarding, and immersive features, including game sequence actions that result from a user's successful control, direction, and manipulation of virtual body parts and objects or non-virtual robots, prostheses or exoskeleton body parts.

For example, in terms of non-limiting and non-exclusive variations of research and investigation as well as practical application, monitoring brain activity can enhance PEGs' pre-action training value. ABI/TBI survivors' brain activities or processes can be measured through any brain imaging technology or by analyzing blood and/or other body fluids, or biomarkers, or other substances for particular bio-chemicals, markers, and/or compounds related to without limitation overall brain cortical, or cognitive activity. ABI/TBI survivors' baseline brain activities or processes could be determined before, during and after PEGs training to measure changes accompanying PEGs training. Additionally, ABI/TBI survivors' brain activities or processes can be compared to non-ABI/TBI affected individuals undergoing or who underwent PEGs training activities to determine whether PEGs training is stimulating the same or similar affected parts of the ABI/TBI survivors' brains as are stimulated in the non-ABI/TBI affected individuals' brains. PEGs can be adjusted accordingly to enhance the brain activity or processes in the identified brain structures, processes or circuitry of the ABI/TBI survivors to match brain activities (including substance quantities, levels, and the like) of non-affected individuals' brain structures, processes or circuitry accompanying PEGs training. Other non-limiting and non-exclusive variations on the process are discussed below.

PEGs can also be used as a non-invasive diagnostic tool. Some ABI/TBI survivors suffer mild brain injury, however current diagnostics are limited, comprising mostly subjective tests and some technical means. Additionally, while moderate to severe ABI/TBI is detectable through changes in brain morphology by CT-scans, MRI or other imaging technologies, mild ABI/TBI is difficult to detect or diagnose. Any survivor, who does not show severe or moderate TBI, could also be introduced to playing PEGs to monitor for mild ABI/TBI. Potentially mildly affected patients would play PEGs, and her/his brain activities would be compared to unaffected individuals' baseline brain activities to determine the comparative state or extent of mild injury or the possibility of unlikely or no detectable injury. PEGs may be used for assessing other levels of ABI/TBI, either solo or in conjunction with other methods or devices.

Various aspects are now described with reference to the drawings. In the following description, for purposes of explanation, numerous specific details are set forth in order to provide a thorough understanding of one or more aspects. It may be evident however, that such aspect(s) may be practiced without these specific details. Turning to FIG. 1, a system 100 is presented for presentation and manipulation of a virtual body part as means for pre-action training a user. In an aspect, system 100 may include a computer device 102, an input device 104, a display device 106, and a user measurement device 108. Additionally, system 100 may optionally include an external body part device 128 and/or a feedback device 130. According to an aspect, computer device 102 may be configured to receive and process one or more user inputs 110 from input device 104, one or more user characteristics 112 from user measurement device 108, and may also be configured to generate and transmit one or more display control messages 114 to display device 106. In addition, computer device 102 may be configured to execute manipulation of a displayed virtual body part based on at least the inputs 104 of user 120.

Furthermore, computer device 102 may include a processing engine 116, which may be configured to receive, process, and transmit signals associated with display, control, and/or behavior of a virtual body part. Additionally, computer device 102 may include a memory 118, which may be configured to store user characteristics (such as neurological or chemical characteristic values observed and/or measured from a user 120) and/or instructions for executing one or more PEGs.

In an aspect, input device 104 may be configured to receive one or more physical or non-physical inputs 122 from a user 120 and process and forward the processed physical inputs to computer device 102 as inputs 110. In an aspect, input device 104 may be any means of receiving direct physical input from a user 120, such as, but not limited to a keyboard, mouse, touch pad, smart phone, laptop, smart phone, computer or generic computing device, an input device that senses input without intervention of the user, etc. Alternatively or additionally, input device 104 may be a device configured to generate input 110 by recognizing and processing one or more user actions at user action recognizing component 124. For example, in an aspect, user action recognizing component 124 may be configured to recognize user inputs via, by non-limiting example, eye action, nominal physical action of hands or other body parts, blinking, nodding, and/or by detecting and monitoring neurological signals generated by the user's body. For example, user action recognizing component 124 may include a component capable of reading instructions signaled in the brain, spinal cord, or any other neurological circuit or tissue of the user 120.

Furthermore, display device 106 may be configured to display a virtual body part and actions of the virtual body part. In an aspect, display device 106 may display the virtual body part visually on a screen or display, such as, but not limited to, a computer monitor, projector, television, or the like). Alternatively or additionally, external body part device 128 may receive one or more external body part control signals 132, which may cause the external body part device 128 to move, for example, by mechanical means. In an aspect, external body part device 128 may be, but is not limited to being, a robotic arm, shoulder, or the like. In some examples, the external body part device 128 may stand alone and be placed in a location viewable by the user 120. Additionally, the external body part device may be attached to the user 120, which may allow the user to witness more "true to life" actions associated with his or her physical inputs 122.

In yet another aspect, system 100 may include a feedback device 130 configured to provide feedback 136 to the user 120. In an aspect, feedback device 130 may receive one or more feedback control messages 134 related to the feedback device from computer device 102, which may govern the action and behavior of the feedback device 130. In an aspect, feedback 136 may include, but is not limited to, force feedback, pneumatic feedback, auditory or visual feedback, non-force feedback, or any other form of feedback that may indicate an output of computer device 102 related to pre-action training. For non-limiting example, feedback device 130 may be a mechanical device that a user may attach to his or her hand or arm that may provide force feedback to the user's hand or arm in order to bend the user's wrist. In such an example, this bending may occur where the user selects a virtual wrist on display device 106 and moves the virtual wrist up and down (or in any direction) by moving input device 104. Based on this input, processing engine 116 may generate and transmit a feedback control message 136 to the feedback device 130—here, the mechanical device—which may provide a force to the user's wrist to move it substantially in unison with the action of the virtual image, which may be displayed on display device 106 concurrently.

In an additional aspect, system 100 may include a user measurement device 108, which may be configured to measure one or more user characteristic values before, during, and/or after engaging in pre-action training activities. In some examples, user characteristic values may include without limitation neurological or chemical data, pulse, blood pressure, or any other measureable characteristic or physical parameter of an animal, which may include a human being. In an aspect, user measurement device may utilize imaging technology to measure these user characteristics, and such imaging technologies may include, without limitation, Magnetic Resonance Imaging (MRI), Functional Magnetic Resonance Imaging (fMRI), Computed Tomography (CT), Positron Emission Tomography (PET), Electroencephalography (EEG), Magnetoencephalography (MEG), Near-infrared spectroscopy (NIRS), and High Density Fiber Tracking (HDFT).

In a further aspect, user measurement device 108 may send the measured user characteristic data 112 to computer device 102 upon measurement. There, the user characteristic data may be (a) stored in memory 118 for later use or (b) fed to processing engine 116 as feedback data that processing engine 116 may utilize to alter an ongoing pre-action training activity, such as an ongoing PEG, or may be used to diagnose a medical condition. Alternatively, where the user characteristic data is stored in memory, such data may be used to tailor future pre-action training activities to the user's individual characteristics or current skill level or to track the progress of a user over time, or to improve PEGs.

Figure 2:
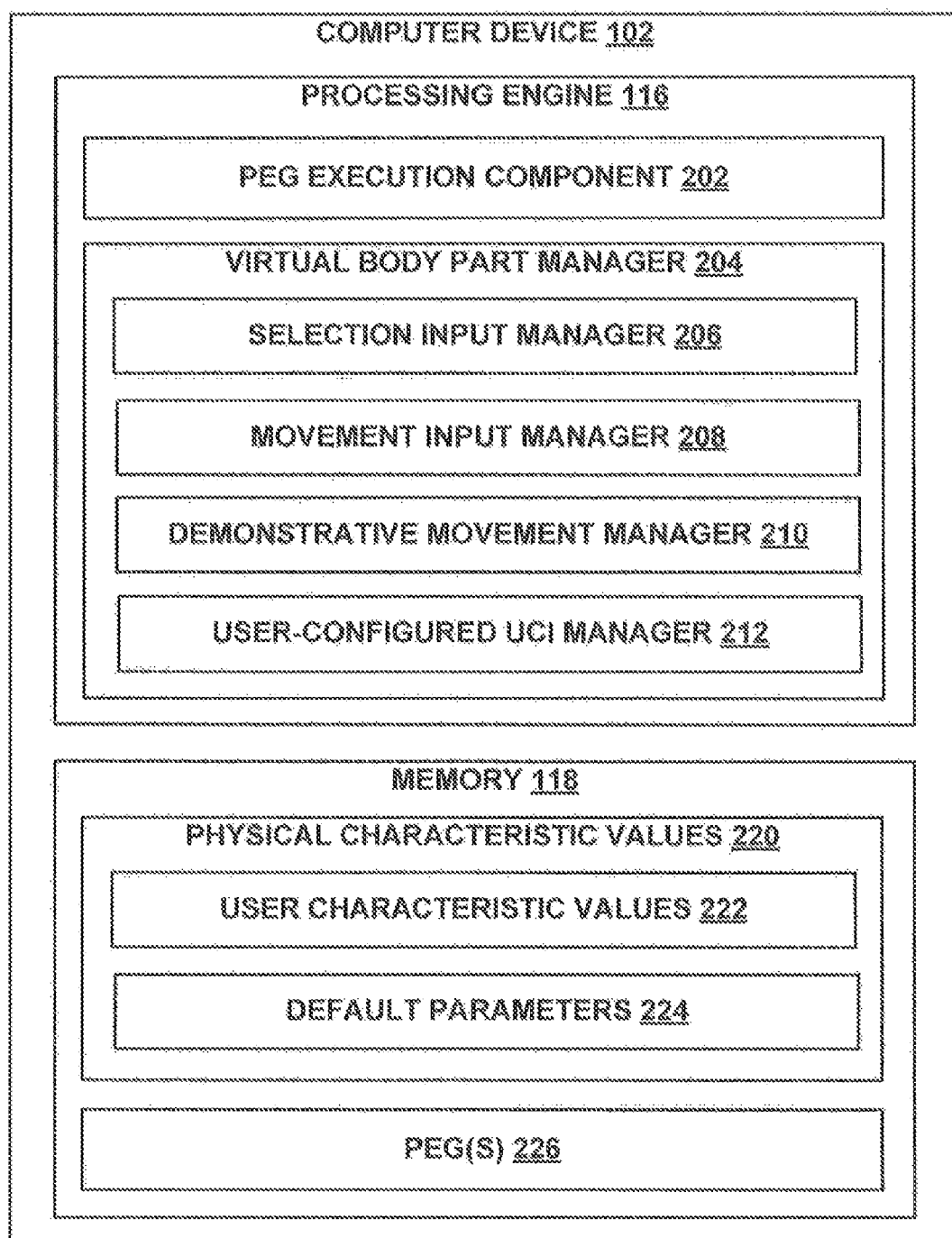
FIG. 2 is a component block diagram of aspects of a computer device for pre-action training according to aspects of the present disclosure.

Turning to FIG. 2, an illustration of components comprising computer device 102 (FIG. 1) is provided. In operation, computer device 102 may present an initial or default virtual body part to a user, for example, when the user, trainer, coach, therapist, or any other type of user initially boots up computer device 102, selects a PEG 226 for pre-action training activities, or the like. To display this default virtual body part, virtual body part manager 204 may query memory 118 for default parameters 224 of a set of physical characteristic values 220 stored thereon and may process and display the default virtual body part by sending, for example, one or more display control signals to a display. In addition, once the user begins a pre-action training session, computer device 102 may receive inputs from the user, such as, but not limited to, selection inputs and action inputs. Based on these one or more inputs and pre-stored and executable PEGs 226 located in memory 118, the computer device may present a selectable, movable, and otherwise interactive virtual body part with which a user may engage to partake in pre-action training activities.

As previously outlined, computer device 102 may include processing engine 116 and memory 118—the operation and composition of which will be explained in reference to FIG. 2. First, processing engine 116 may be configured to process one or more input signals and transmit the processed signals to a display device for presentation of a user-controllable image, such as a virtual body part, to a user. For purposes of the present description, a user-controllable image (UCI) may be all or part of a virtual body part or object controllable by user input to simulate physical actions, wherein these physical actions are non-corresponding to the user's physical actions in generating the user input. Examples of UCIs described herein may comprise a virtual body part or virtual body parts, but the scope of such examples should not be limited thereto.

In an aspect, processing engine 116 may include a PEG execution component 202, which may process user inputs to generate display control messages according to instructions related to one or more PEGs. In a non-limiting example, a user may select a particular PEG to play and as a result, PEG execution component 202 may load the PEG instructions from PEGs 226 stored in memory 118. After loading the PEG, the PEG execution component 202 may generate one or more display control messages for transmission to a display device based on the PEG and any input messages received from an input device. Furthermore, in an aspect, PEG execution component 202 may be configured to alter one or more PEGs based on feedback from a user measurement device. In a non-limiting example, PEG execution component 202 may receive an indication that a user's neurological system is stronger than in the past and may make playing a particular PEG more difficult to maximize further neurological improvement.

In an additional aspect, processing engine 116 may include a virtual body part manager 204, which may be configured to virtually construct and manage action of a virtual body part that computer device 102 may generate for display on a display device. Furthermore, for purposes of the present description, the term "display device" may correspond to display device 106, external body part device 128, feedback device 130, or any other device or means capable of producing output corresponding to an action, and/or status of a virtual body part, including output resulting from user input during pre-action training activities.

In an aspect, virtual body part manager 204 may include a selection input managing component 206, which may be configured to receive one or more selection inputs from a user or an input device manipulated by a user, wherein the selection inputs may correspond to a user selecting a virtual body part or a portion thereof. Furthermore, based on a selection input, selection input manager 206 may map a select location associated with a selection input to a virtual body part or a portion thereof, which may correspond to a virtual body part selected for subsequent or concurrent action by the user.

Furthermore, virtual body part manager 204 may include an action input manager 208, which may be configured to receive one or more action inputs from a user and generate one or more display control signals that cause displayed action of the virtual body part. In an aspect, this displayed action may correspond to the virtual body part or portion thereof selected by the user and mapped by selection input manager 106. Additionally, action input component 206 may generate and display the displayed action based on the user "dragging" "pointing" "tapping" "touching" or otherwise correctly manipulating at least a portion of the moveable body part.

Furthermore, action input component 206 may base its virtual body part action generation and/or other processing actions on a particular PEG, which may have been pre-selected by a user and loaded for execution by processing engine 116. In an aspect, an action input may be input by a user and received by computer device 102 as a result of the user partaking in such a PEG, other pre-action training activity, or any other pre-action training activity. Additionally, in an aspect of the present disclosure, a user input action may be physically non-corresponding to the desired or eventual action of the displayed virtual body part with which the user is interacting. For purposes of the present disclosure, a non-corresponding action may be a user action that differs relatively significantly from a displayed action. For non-limiting example, suppose a user engaged in a pre-action training activity wishes to move a virtual forearm directly upward using a mouse as an input device. To do so, according to aspects of the disclosure, the user may first navigate a cursor and click a mouse button to select the virtual forearm on a display device, thereby inputting a selection input. Next, the user may keep the cursor on the virtual forearm and may hold the mouse button down to signal a beginning of an action input. Thereafter, the user may drag the mouse two inches along a mouse pad, with the mouse button held down, and may observe the virtual forearm rise upward, for example, from a virtual hip area to a virtual head area. To carry out this action, the user's forearm may have moved approximately two inches in a direction parallel to the mouse pad, but resulted in a virtual action of the virtual forearm that was upward in direction and appeared greater than two inches in magnitude. Therefore, this example user input action is non-corresponding to the action of the virtual body part.

Additionally, virtual body part manager 204 may include a demonstrative action manager 210, which may be configured to provide display control messages to a display device to effectuate a demonstrative action of the virtual body part. For example, demonstrative action manager 210 may store and/or execute a retrieved demonstrative action to be displayed to the user as a "ghost" action. In an aspect, the user may view the demonstrative action and may then attempt to manipulate the virtual body part to mimic the action of the demonstrative action or ghost action.

Furthermore, virtual body part manager 204 may include a user-configured UCI manager 212, which may tailor or otherwise configure a displayed virtual body part to a user's body and/or alter the behavior of the displayed virtual body part based on one or more user characteristic values 222. In an aspect, such characteristics may include anatomical and physiological data characteristic values associated with the user, such as without limitation height, weight, arm length, muscle mass, TBI-affected body parts, handedness, age, gender, eye/hair/skin color, and the like. In additional or alternative aspects, the user characteristics may include historical PEG performance data associated with the user, current neurological or chemical measurement characteristics or parameter values, or the like.

In an aspect, user-configured UCI manager 212 may obtain these user characteristic values 222 from memory 118. Alternatively, user-configured UCI manager 212 may obtain these user characteristic values from a source external to memory 118, such as, but not limited to, a user measurement device configured to measure neurological and/or chemical characteristics of the user during pre-action training activities, by querying a user or the user's trainer, doctor, coach, therapist or rehabilitation specialist for such characteristic values and receiving a characteristic value input in response, or otherwise receiving user-specific performance, anatomical, physiological, or other characteristic values.

In addition, user-configured UCI manager 212 may be configured to compare the user characteristic values, or user parameters, to one or more default parameters 224 stored in memory 118. In an aspect, default parameters 224 may comprise the parameters of a default virtual body part of the present disclosure, and may include without limitation anatomical and physiological data (e.g. handedness, strength, bone length, limitations on range of motion, skin characteristics, and the like). Such characteristics may conform the behavior and attributes of the default virtual body part displayed to a user before tailoring, configuring, or otherwise customizing the virtual body part to the user. In order to perform such customization, the user-configured UCI manager 212 may compare the obtained user characteristic values (e.g. user characteristic values 222) to default parameters 224. In an aspect, where the comparing determines that a user characteristic value differs from the default parameter value for a characteristic, the user-configured UCI manager may set the compared parameter of the virtual body part to be displayed to the user's characteristic value. Alternatively, where an obtained user characteristic value does not differ from the default parameter, user-configured UCI manager 212 may leave the compared parameter unchanged.

In an additional aspect, processing engine 116 may be configured to generate and/or transmit one or more display control signals to the display device to effectuate action of the virtual body part. Furthermore, processing engine 116 may be additionally configured to calculate and/or report an action degree or action magnitude associated with an action of the virtual body part. In an aspect, processing engine 116 may display the calculated action degree or action magnitude by generating one or more display control messages, which may be generated and transmitted in substantially real time, for transmission to a display device for visual indication of the action degree to the user.

Furthermore, computer device 102 may include a memory 118, which may be configured to store information for utilization by other components in a system, such as, but not limited to, processing engine 116. Such information may include physical characteristic values 220, which may include user characteristic values 222 associated with one or more users and/or default parameters 224 associated with a baseline or default UCI, such as a virtual body part. Furthermore, memory 118 may store neurological, chemical, or any other data related to a user's body (e.g. without limitation neurological signaling data or maps, neuron activity data, etc.) generated and/or observed by a user measurement device before, during, and/or after a user engaging in pre-action training. Such data may also be fed back to processing engine 116, which may alter a current or future PEG or pre-action training activity based on the feedback.

In an additional aspect, such user data may be used to diagnose one or more medical conditions. For example, computer device may output the user data to a physician or other professional, who may analyze the data and diagnose the medical condition. In an alternative or additional and non-limiting example, computer device 102 may contain instructions executable by processing engine 116 to automatically diagnose a medical condition based on the user data stored on memory 118.

In addition, memory 118 may include executable instructions (e.g. executed by processing engine 116), that when performed, allow the user to engage in one or more pre-action training activities. As used herein, pre-action training activities may include interactive electronic games or activities, such as, but not limited to, Pre-Action Exercise Games (PEGs) 226. The PEGs 226 may govern the behavior of a virtual body part in response to one or more inputs by a user during pre-action training activities.

Additionally, cognitive function is involved in all PEGs. According to some example PEGs, virtual upper body parts are presented to a user to control in order to simulate purposeful physical actions—for example, opening and closing a virtual hand. Some PEGs may be virtual task games, which may couple player control of virtual body parts and objects to accomplish tasks and/or solve problems—for example, dropping a spoon into a cup.

Furthermore, upper extremity exercises of some non-limiting example PEGs may include player control of any part or all of an affected hand, lower or upper arm (right or left), executing flexion/extension, supination/pronation, abduction/adduction, or any other extremity or body part action in any direction. According to the PEGs contemplated herein, users can manage displays of some of, the majority of, or all of a virtual upper extremity from substantially any angle. Additionally, the virtual body part may comprise fingers, which may be manipulated individually or in combination. The virtual body part may comprise a wrist, which may be flexed/extended, abducted/adducted, or supinated/pronated. Furthermore, according to some non-limiting example PEGs, the virtual body part may comprise an arm, wherein the lower and upper arm may be manipulated independently or in combined action of any and all joints of the arm, wrist and hand.

In some non-limiting example PEGs where the virtual body part is a virtual hand, example games for pre-action training may include: [0083] pincer action to grasp a key [0084] two finger action to grasp a ball and drop it into a cup [0085] multi-finger action to pick up a spoon and drop it into a cup [0086] full hand grasp around a mug handle [0087] tapping actions by index and middle fingers on a remote controller [0088] hand grasps of objects shaped as stars, circles or squares, then placement in similarly shaped slots.

Regarding virtual arms in some non-limiting example PEGs where the virtual body part includes a virtual arm and/or a virtual hand, example games for pre-action training may include:

opening a correct box, i.e. selecting and opening the correct numbered and colored box (e.g. purple 24) in a circle of nine boxes, after observations and computations as elementary as choosing the (single) "lowest purple box bearing an even number" (purple 24 is correct) to computations based on several numbered boxes, e.g. "choose the highest blue even numbered box, subtract the second of its numbers from the first, square it and find the green box with that result" (if 92 blue is selected the subtraction yields number 7, which when squared is 49, so green box 49 is correct) [0091] same as above, nine box game with voice instructions to the player [0092] similar open the box game in a more elementary vertical presentation of five boxes [0093] light bulb game requiring the player to unscrew a light bulb, choose the correct lettered socket and screw the bulb into the correct socket [0094] playing card games, for example in a simple game the virtual arm and hand are controlled to select a pair of twos, place that pair, right side up on a surface, then the player must choose the lowest numbered pair that wins over a pair of twos, alternately the highest numbered pair that wins over twos, then the lowest (or highest) pair of picture cards that wins over twos and so forth, to more complex combinations of playing cards/hands [0095] puzzle games in which the cursor is used to move 6, 9 or 16 puzzle pieces to assemble a complete representation of any display noted above. For example, a hand image, in any orientation, position and configuration may be disassembled by the puzzle game into 6, 9 or 16 puzzle pieces to be reassembled by the player, or a more complex disassembly of the nine box arm game may be "puzzled" [0096] simple number game displaying 0-9 and processes (add, subtract, multiply, divide and equals sign) and calling for the PEGs player to use a virtual arm and hand to select numbers and processes and to make any number of computations by arraying the numbers and processes accurately [0097] simple letter game displaying all letters of the alphabet and calling for the PEGs player to use a virtual arm and hand to select letters to make any number of words by arraying the letters accurately.

Where the virtual body part is at least one virtual muscle, games for pre-action training may include selection of said at least one virtual muscle to cause it to contract or relax at any rate of speed or to stop, for non-limiting example to end cramping or focal cervical dystonia or to regain movement impeded by hand dystonia.

Therefore by loading and/or executing the one or more stored PEGs 226 of memory 118, computer device 102 may present a user with a UCI, such as a virtual body part, with which the user may interact to participate in pre-action training activities.

Figure 3:
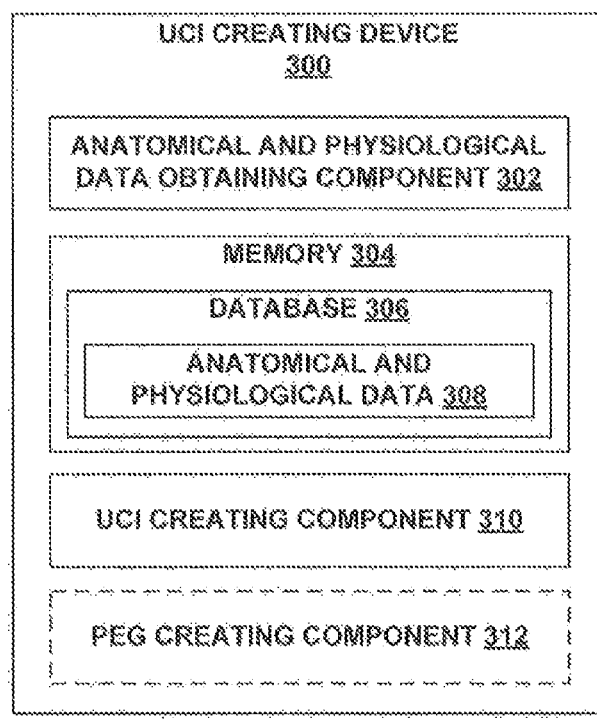
FIG. 3 is a component block diagram of aspects of a UCI constructing device according to aspects of the present disclosure.

Turning to FIG. 3, the figure illustrates an example UCI creating device 300 that facilitates creation of UCIs, including one or more virtual body parts. In an aspect, UCI creating device 300 may include an anatomical and physiological data obtaining component 302, which may be configured to obtain anatomical and physiological data associated with one or more animal species, including, but not limited to, human beings. Such anatomical and physiological data may be accurate or relatively accurate anatomical and physiological data to ensure that a relatively life-like UCI may be created therefrom. In a non-limiting example, anatomical and physiological data obtaining component 302 may be configured to interface, communicate with, read, extract data from, or obtain data from an external device or component that contains such anatomical and physiological data, such as, but not limited to a server, a device connected to a network (e.g the Internet), a wireless device, or a device connected to UCI creating device by hard wire communication line. In an additional aspect, anatomical and physiological data obtaining component 302 may be configured to prompt a user to manually input anatomical and physiological data and receive such data from a user via an input device such as, but not limited to, a keyboard.

Additionally, UCI creating device 300 may include a memory 304, which may include one or more databases 306 for storing and organizing data. In an aspect, database 306 may store anatomical and physiological data 308, which may have been obtained via anatomical and physiological data obtaining component 302.

Furthermore, UCI creating device 300 may include a UCI creating component 310, which may be configured to receive one or more inputs, such as, but not limited to program instructions, from a user (e.g. UCI architect, programmer, graphic designer), wherein the inputs, when executed, construct a UCI. In an aspect, the received inputs may construct the UCI based on the stored anatomical and physiological data 308. Furthermore, UCI creating component may include an executable program, such as an image design program, graphics creation suite, programming/compiling engine, or rendering suite, which UCI creating component 310 may execute to receive the one or more inputs from the user. These one or more inputs may define the physical parameters of the UCI, such as, but not limited to the bone length, bone interaction and position, tendon length and position, skin tone, and the like. Furthermore, the inputs may form computer-executable instructions that define and/ or otherwise control the behavior of the UCI or portions of the UCI when executed, displayed, and interacted with by a user, for example, during pre-action training such as when playing a PEG. In addition, inputs may define the behavior of virtual body parts adjacent to the selected or moved body parts such that action of one virtual body part or portion thereof causes related action of the adjacent virtual body part or a portion thereof.

Moreover, UCI creating device 300 may include a PEG creating component 312, which may be configured to create one or more PEGs by receiving one or more inputs, such as, but not limited to program instructions, from a user (e.g. PEG architect, programmer), wherein the inputs, when executed, construct a PEG. The created PEG may be created for purposes of pre-action training and may be programmed to alter the behavior of a UCI, such as a virtual body part, based upon user inputs. Furthermore, the PEG may be programmed to customize or tailor a PEG based on unique characteristic data associated with the user, such as, but not limited to, height, weight, historical PEG performance, handedness, extremity length, and the like.

Figure 4:
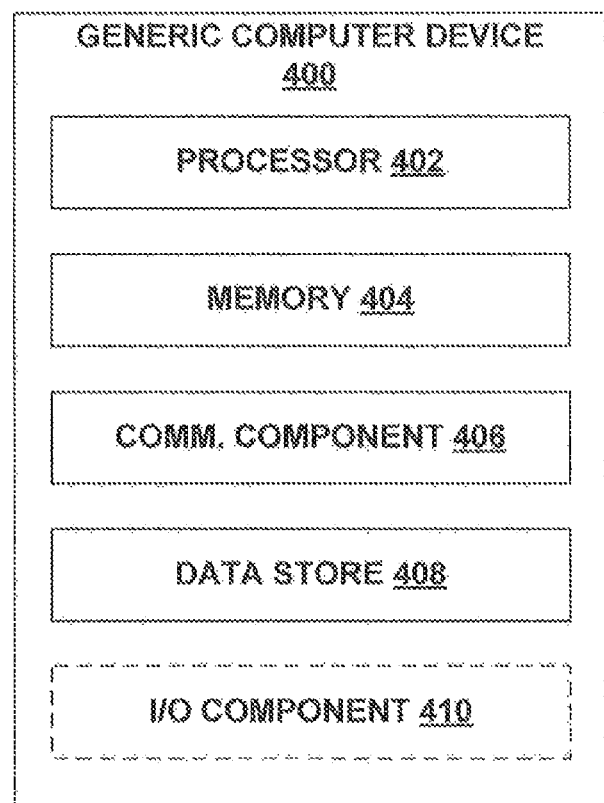
FIG. 4 is a component block diagram of aspects of a generic computer device according to aspects of the present disclosure.

Referring to FIG. 4, in one aspect, generic computer device 400 may include a specially programmed or configured computer device, and may represent or contain components that may be included in computer device 102 FIGS. 1 and 2) or UCI creating device 300 (FIG. 3). Generic computer device 400 includes a processor 402 for carrying out processing processes associated with one or more of components and processes described herein. Processor 402 can include a single or multiple set of processors or multi-core processors. Moreover, processor 402 can be implemented as an integrated processing system and/or a distributed processing system. Additionally, processor 402 may be configured to perform the processes described herein related to UCI behavior and/or pre-action training on the generic computer device 400.

Generic computer device 400 further includes a memory 404, such as for storing data used herein and/or local versions of applications being executed by processor 402. Memory 404 can include any type of memory usable by a computer, such as random access memory (RAM), read only memory (ROM), tapes, magnetic discs, optical discs, volatile memory, non-volatile memory, and any combination thereof. Additionally, memory 404 may be configured to store data and/or code or computer-readable instructions for performing the processes described herein related to creating, controlling, manipulating, and/or instantiating a UCI.

Further, generic computer device 400 includes a communications component 406 that provides for establishing and maintaining communications with one or more entities utilizing one or more of hardware, software, and services as described herein. Communications component 406 may carry communication signals between components on generic computer device 400, as well as exchanging communication signals between generic computer device 400 and external devices, such as devices located across a wired or wireless communications network and/or devices serially or locally connected to generic computer device 400. For example, communications component 406 may include one or more buses, and may further include transmit chain components and receive chain components associated with a transmitter and receiver, respectively, or a transceiver, operable for interfacing with external devices.

Additionally, generic computer device 400 may further include a data store 408, which can be any suitable combination of hardware and/or software, that provides for mass storage of information, databases, and programs employed in connection with aspects described herein. For example, data store 408 may be a data repository for applications and data not currently being executed by processor 402, such as those related to the aspect described herein. In addition, generic computer device 400 may contain an input/output component 410, which may be configured to interface with one or more external devices, such as an input device (e.g. input device, user measurement device (FIG. 1)) and/or an output device (e.g. a display, feedback device, or external body part device (FIG. 1)). Specifically, input/output component 410 may contain circuitry and/or instructions that allow generic computer device 400 to connect to and/or communicate with these external devices.

Figure 5:
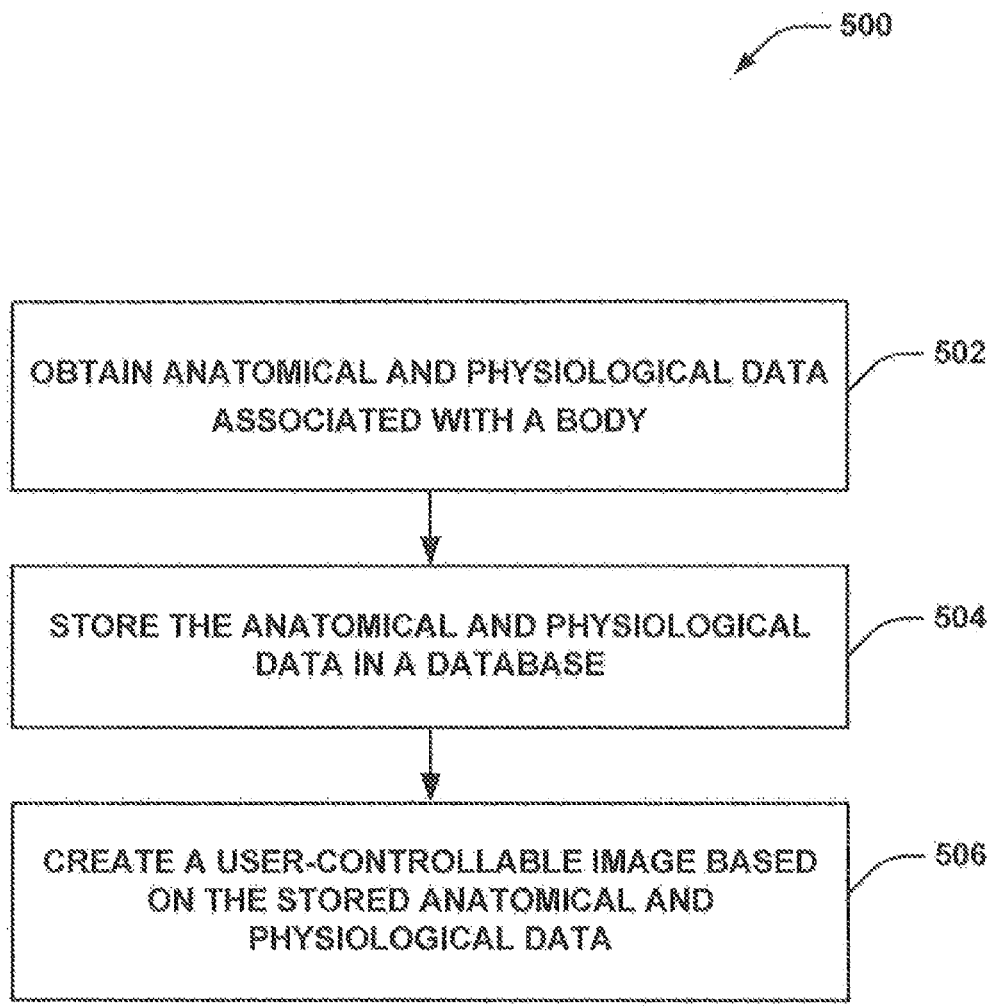
FIG. 5 is a flow diagram illustrating aspects of an example method of constructing a UCI according to the present disclosure.

In reference to FIG. 5, provided is an example methodology 500 for creating or otherwise constructing a user-controllable image, such as a virtual body part. In an aspect, at block 502, a user (e.g. a program engineer, user, or graphics engineer) or computer device may obtain anatomical and physiological data associated with a body. Once obtained, at block 504, the user or computer device may store the anatomical and physiological data in a database. In addition, at block 506, the user or computer device may create the user-controllable image based on the stored anatomical and physiological data. Furthermore, the created user-controllable image may be configurable to a user. Additionally, according to some example methods, at least a moveable portion of the user-controllable image may be constructed to move based on input from a user, for example, so as to enable pre-action training the user.

Figure 6:
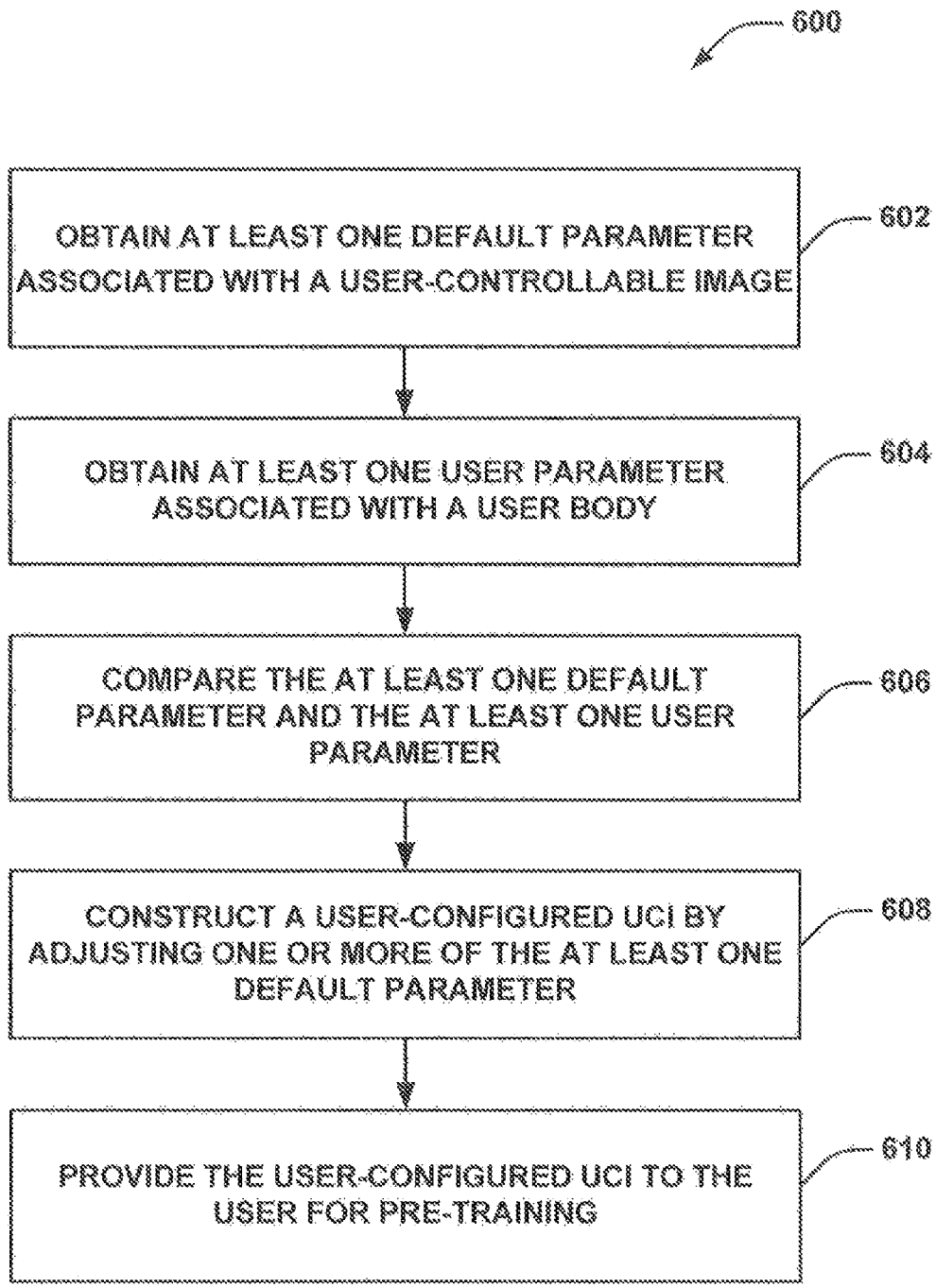
FIG. 6 is a flow diagram illustrating aspects of an example method of configuring a UCI to a user according to the present disclosure.

Furthermore, FIG. 6 presents an example methodology 600 for configuring, tailoring, or otherwise customizing a UCI or related PEG to a particular user. Such a method may be performed by a computer device, but may also be performed or controlled via a computer device by an individual, e.g. a pre-action training coach, therapist, or doctor, who may guide a user through a pre-action training regimen. In an aspect, at block 602, the individual or computer device may obtain at least one default parameter associated with the user-controllable image. In addition, at block 604, the individual or computer device may obtain at least one user parameter associated with a user body. Furthermore, at block 606, the individual or computer device may compare the at least one default parameter and the at least one user parameter. Moreover, the individual or computer device may construct a user-configured user-controllable image by adjusting one or more of the at least one default parameter. In an aspect, such an adjustment may be made where the at least one user parameter differs from the at least one default parameter. Additionally, the user-configured user-controllable image may be configured so as to enable pre-training a user, and as such, at block 610, the individual or computer device may provide the user-configured user-controllable image to the user for pre-action training.

Figure 7:
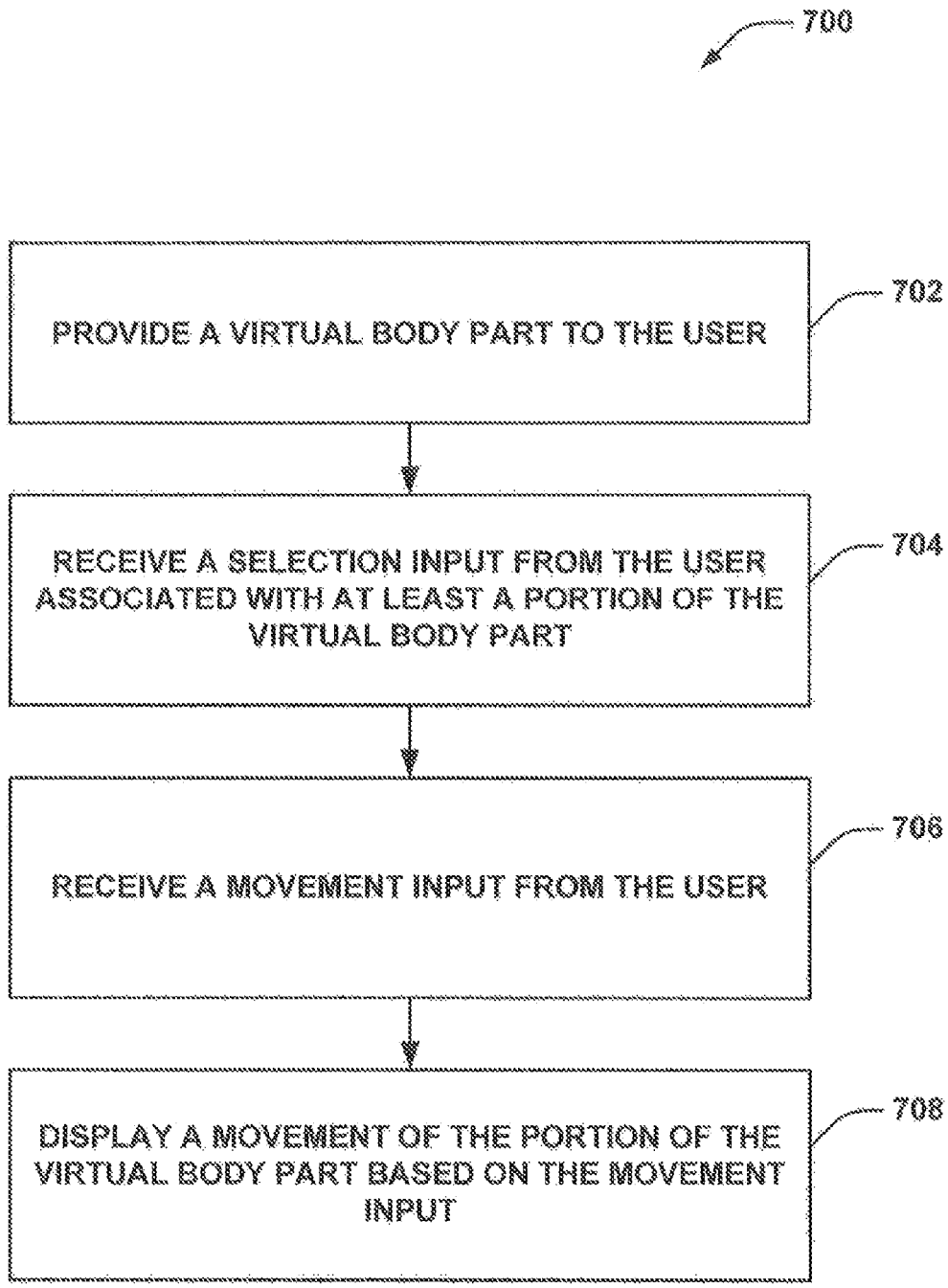
FIG. 7 is a flow diagram illustrating aspects of an example method of providing pre-action training activities to a user according to the present disclosure.

Turning to FIG. 7, an example methodology 700 is presented for presenting a controllable virtual body part to a user. In an aspect, at block 702, a computer device may provide a virtual body part to a user. Furthermore, at block 704, the computer device may receive a selection input from the user, wherein the selection input is associated with at least a portion of the virtual body part. Additionally, at block 706, the computer device may receive an action input from the user. Furthermore, at block 708, the computer device may cause the display of an action of the at least a portion of the virtual body part based on the action input. In an additional aspect, the action may be physically non-corresponding to the action input. Furthermore, the selection input and action input may be at least a part of pre-training a user.

Figure 8:
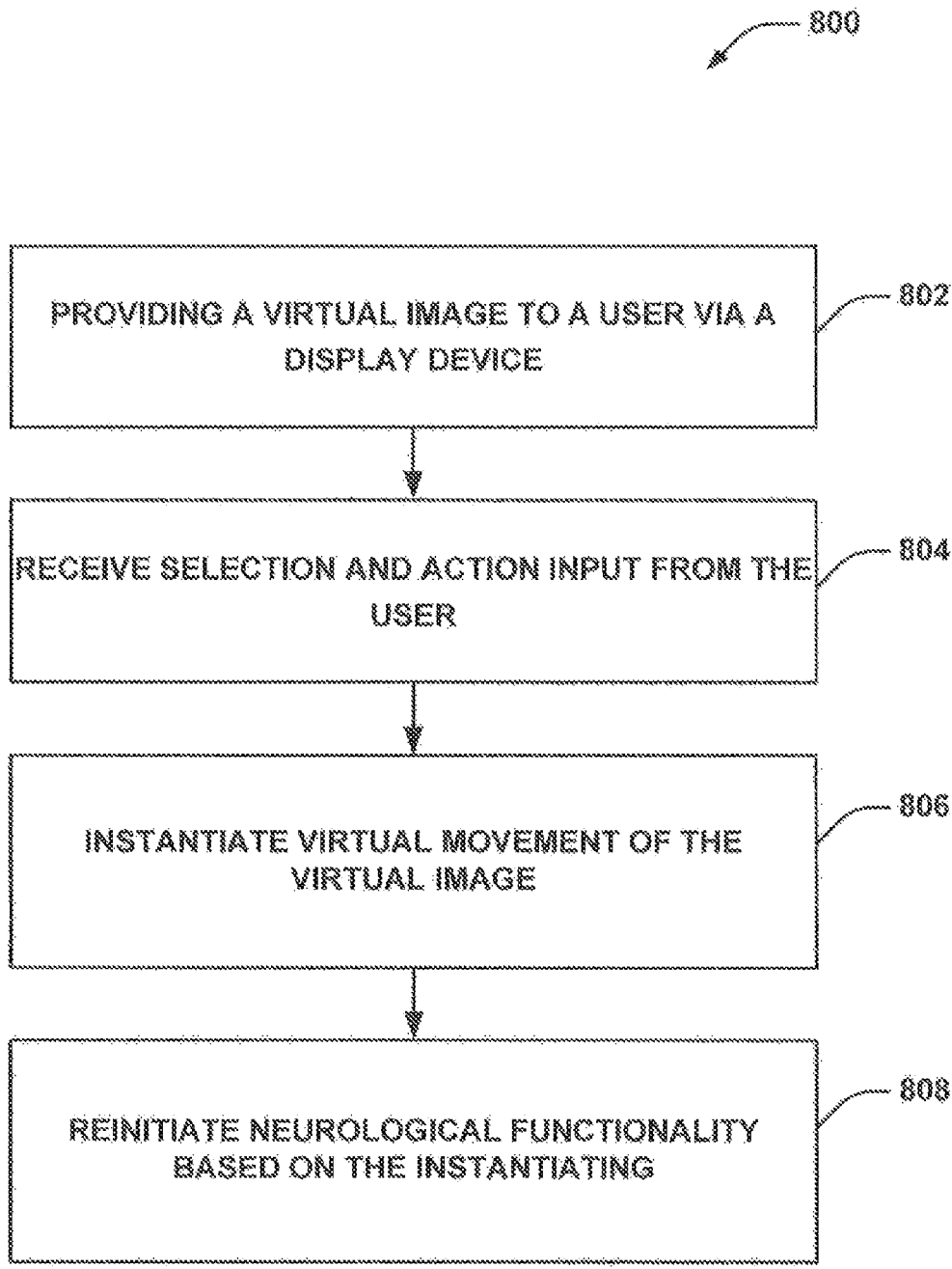
FIG. 8 is a flow diagram illustrating aspects of an example method of instantiating a virtual movement and reinitiating neurological functionality according to the present disclosure.

Turning to FIG. 8, an example methodology 800 is presented for presenting a controllable virtual body part to a user. In an aspect, at block 802, a computer device may provide a virtual body part to a user via a display device. Furthermore, at block 804, the computer device may receive a selection input and an action input from the user. In some aspects, the selection input and the action input may be associated with at least a portion of the virtual image, which may include a virtual body part. Furthermore, the selection input and action input may be at least a part of pre-training a user. Additionally, at block 806, methodology 800 may include instantiating virtual movement of the virtual image. In an aspect, block 806 may be, in a non-limiting aspect, performed by a computer device or by the user. Furthermore, at block 808, the methodology 800 may include reinitiating neurological functionality based on the instantiating. In an aspect, block 808 may be, in a non-limiting aspect, performed by a computer device or by the user.

Figure 9:
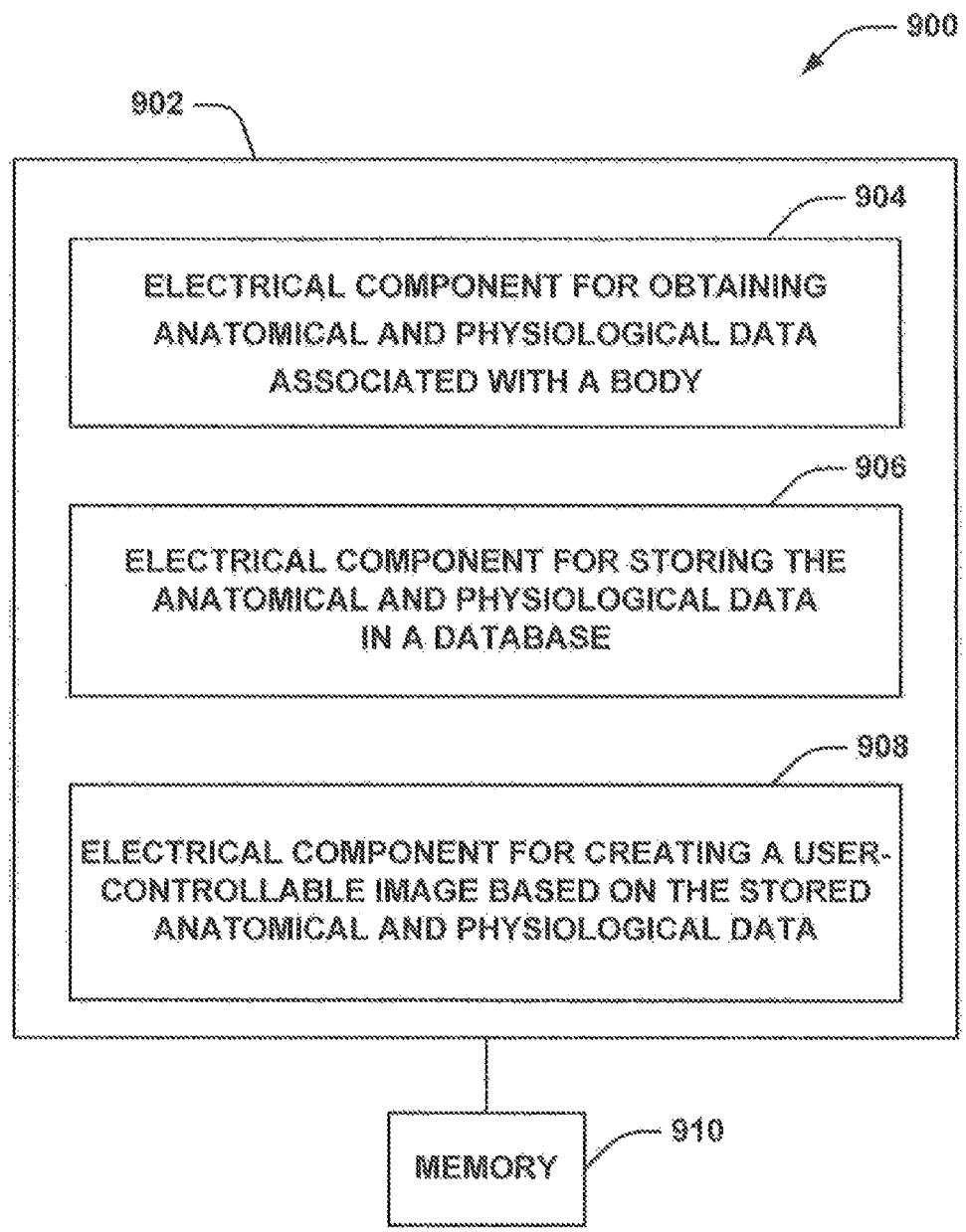
FIG. 9 is a component diagram illustrating an example grouping of electrical components for creating a UCI according to the present disclosure.

Referring to FIG. 9, an example system 900 is displayed for creating a UCI. For example, system 900 can reside at least partially within one or more computing or processing devices. It is to be appreciated that system 900 is represented as including functional blocks, which can be functional blocks that represent processes implemented by a processor, software, or combination thereof (e.g., firmware). System 900 includes a logical grouping 902 of electrical components that can act in conjunction. For instance, logical grouping 902 can include an electrical component 904 for obtaining anatomical and physiological data associated with a body. In an aspect, electrical component 904 may comprise anatomical and physiological data obtaining component 302 (FIG. 3). In addition, logical grouping 902 can include an electrical component 906 for storing the anatomical and physiological data in a database. In an aspect, electrical component 906 may comprise UCI creating device 300, memory 304 (FIG. 3), or processor 402 (FIG. 4). In addition, logical grouping 902 can include an electrical component 908 for creating a UCI based on the stored anatomical and physiological data. In an aspect, electrical component 908 may comprise UCI creating component 310 (FIG. 3).

Additionally, system 900 can include a memory 910 that retains instructions for executing processes associated with the electrical components 904, 906, and 908, stores data used or obtained by the electrical components 904, 906, and 908, etc. While shown as being external to memory 910, it is to be understood that one or more of the electrical components 904, 906, and 908 can exist within memory 910. In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product including a computer readable medium, where each electrical component 904, 906, and 908 can be corresponding code.

Figure 10:
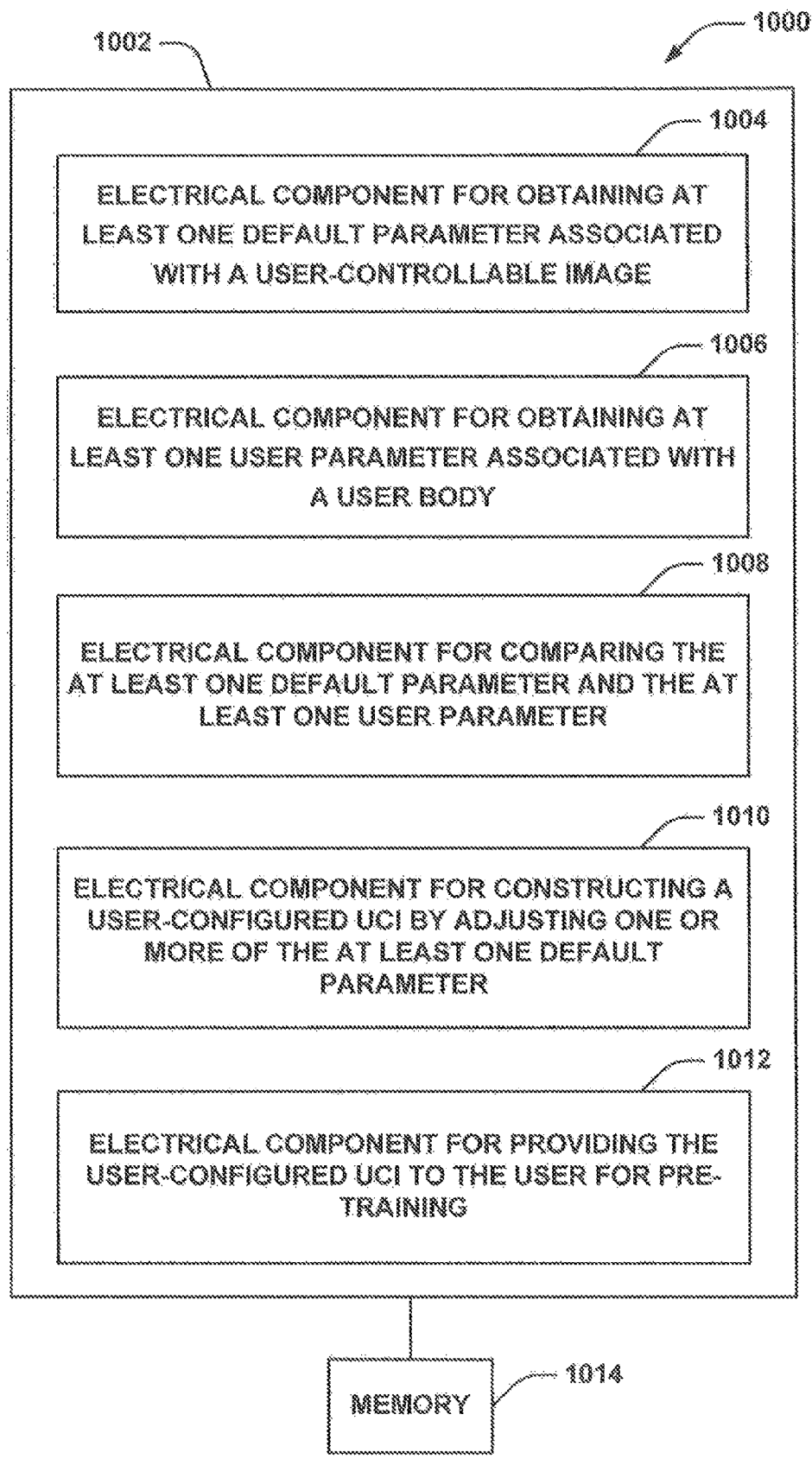
FIG. 10 is a component diagram illustrating an example grouping of electrical components for configuring a UCI to a user according to the present disclosure.

Referring to FIG. 10, an example system 1000 is displayed for creating a UCI. For example, system 1000 can reside at least partially within one or more computing or processing devices. It is to be appreciated that system 1000 is represented as including functional blocks, which can be functional blocks that represent processes implemented by a processor, software, or combination thereof (e.g., firmware). System 1000 includes a logical grouping 1002 of electrical components that can act in conjunction. For instance, logical grouping 1002 can include an electrical component 1004 for obtaining at least one default parameter associated with a UCI. In an aspect, electrical component 1004 may comprise computer device 102 (FIGS. 1 and 2). In addition, logical grouping 1002 can include an electrical component 1006 for obtaining at least one user parameter associated with a user body. In an aspect, electrical component 1006 may comprise computer device 102 (FIGS. 1 and 2). In addition, logical grouping 1002 can include electrical component 1008 for comparing the at least one default parameter and the at least one user parameter. In an aspect, electrical component 808 may comprise user-configured UCI manager 212 (FIG. 2). In addition, logical grouping 1002 can include an electrical component 1010 for constructing a user-configured UCI by adjusting one or more of the at least one default parameter. In an aspect, electrical component 1010 may comprise user-configured UCI manager 212 (FIG. 2). In addition, logical grouping 1002 can include an electrical component 1012 for providing the user-configured UCI to the user for pre-action training. In an aspect, electrical component 1012 may comprise computer device 102 (FIGS. 1 and 2).

Additionally, system 1000 can include a memory 1010 that retains instructions for executing processes associated with the electrical components 1004, 1006, 1008, 1010, and 1012, stores data used or obtained by the electrical components 1004, 1006, 1008, 1010, and 1012, etc. While shown as being external to memory 1010, it is to be understood that one or more of the electrical components 1004, 1006, 1008, 1010, and 1012 can exist within memory 1010. In one example, electrical components 1004, 1006, 1008, 1010, and 1012 can comprise at least one processor, or each electrical component 1004, 1006, 1008, 1010, and 1012 can be a corresponding module of at least one processor. Moreover, in an additional or alternative example, electrical components 1004, 1006, 1008, 1010, and 1012 can be a computer program product including a computer readable medium, where each electrical component 1004, 1006, 1008, 1010, and 1012 can be corresponding code.

Figure 11:
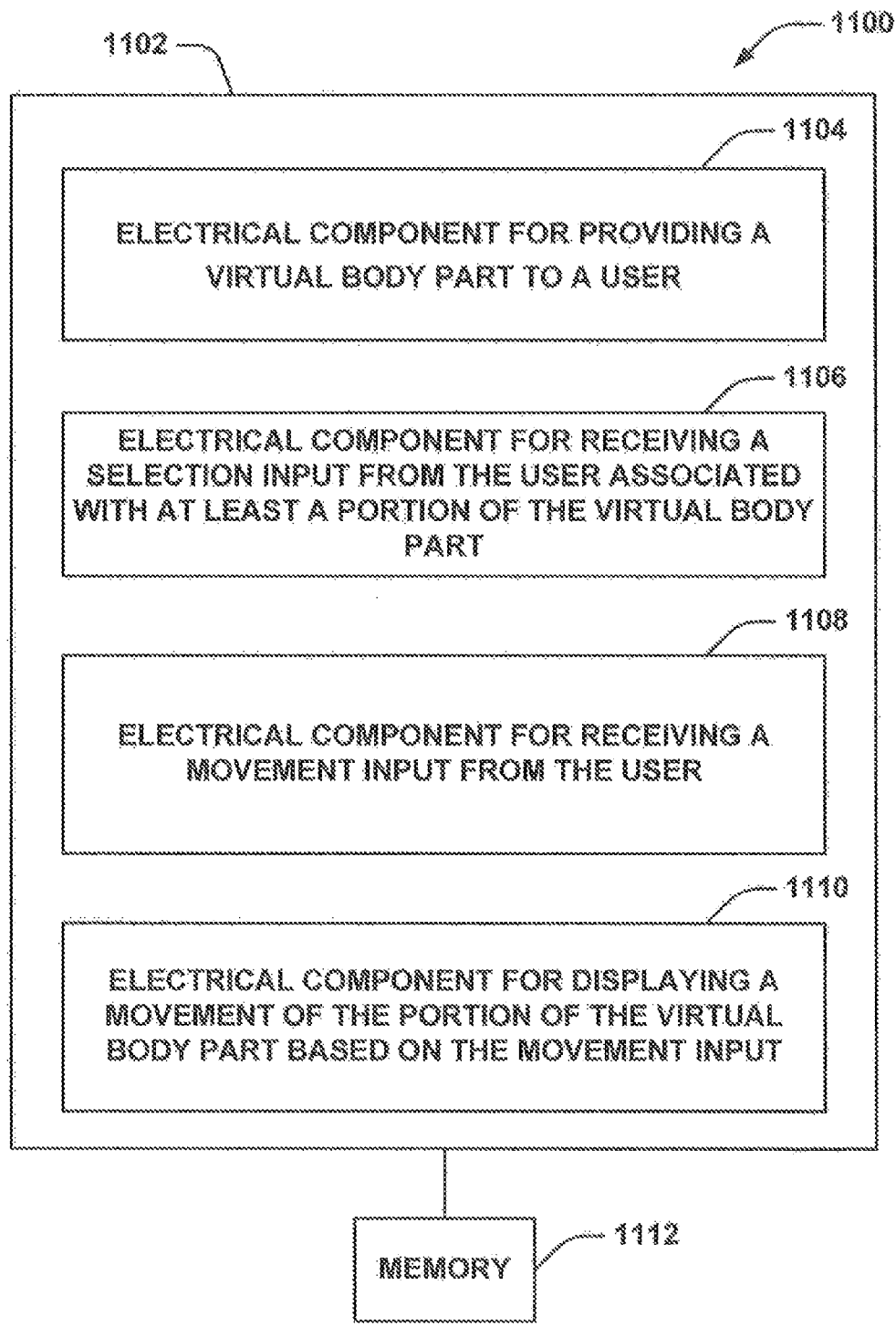
FIG. 11 is a component diagram illustrating an example grouping of electrical components for providing pre-action training activities to a user according to the present disclosure.

Referring to FIG. 11, an example system 1100 is displayed for creating a UCI. For example, system 1100 can reside at least partially within one or more computing or processing devices. It is to be appreciated that system 1100 is represented as including functional blocks, which can be functional blocks that represent processes implemented by a processor, software, or combination thereof (e.g., firmware). System 1100 includes a logical grouping 1102 of electrical components that can act in conjunction. For instance, logical grouping 1102 can include an electrical component 1104 for providing a virtual body part to a user. In an aspect, electrical component 1104 may comprise computer device 102 (FIGS. 1 and 2). In addition, logical grouping 1102 can include an electrical component 1106 for receiving a selection input from the user associated with at least a portion of the virtual body part. In an aspect, electrical component 1106 may selection input manager 206 (FIG. 2). In addition, logical grouping 1102 can include an electrical component 1108 for receiving an action input from the user. In an aspect, electrical component 1108 may comprise action input manager 208 (FIG. 2). In addition, logical grouping 1102 can include an electrical component 1110 for displaying a action of the portion of the virtual body part based on the action input. In an aspect, electrical component 1110 may comprise computer device 102 (FIGS. 1 and 2).

Additionally, system 1100 can include a memory 1110 that retains instructions for executing processes associated with the electrical components 1104, 1106, 1108, and 1110, stores data used or obtained by the electrical components 1104, 1106, 1108, and 1110, etc. While shown as being external to memory 1110, it is to be understood that one or more of the electrical components 1104, 1106, 1108, and 1110 can exist within memory 1110. In one example, electrical components 1104, 1106, 1108, and 1110 can comprise at least one processor, or each electrical component 1104, 1106, 1108, and 1110 can be a corresponding module of at least one processor. Moreover, in an additional or alternative example, electrical components 1104, 1106, 1108, and 1110 can be a computer program product including a computer readable medium, where each electrical component 1104, 1106, 1108, and 1110 can be corresponding code.

Figure 12:
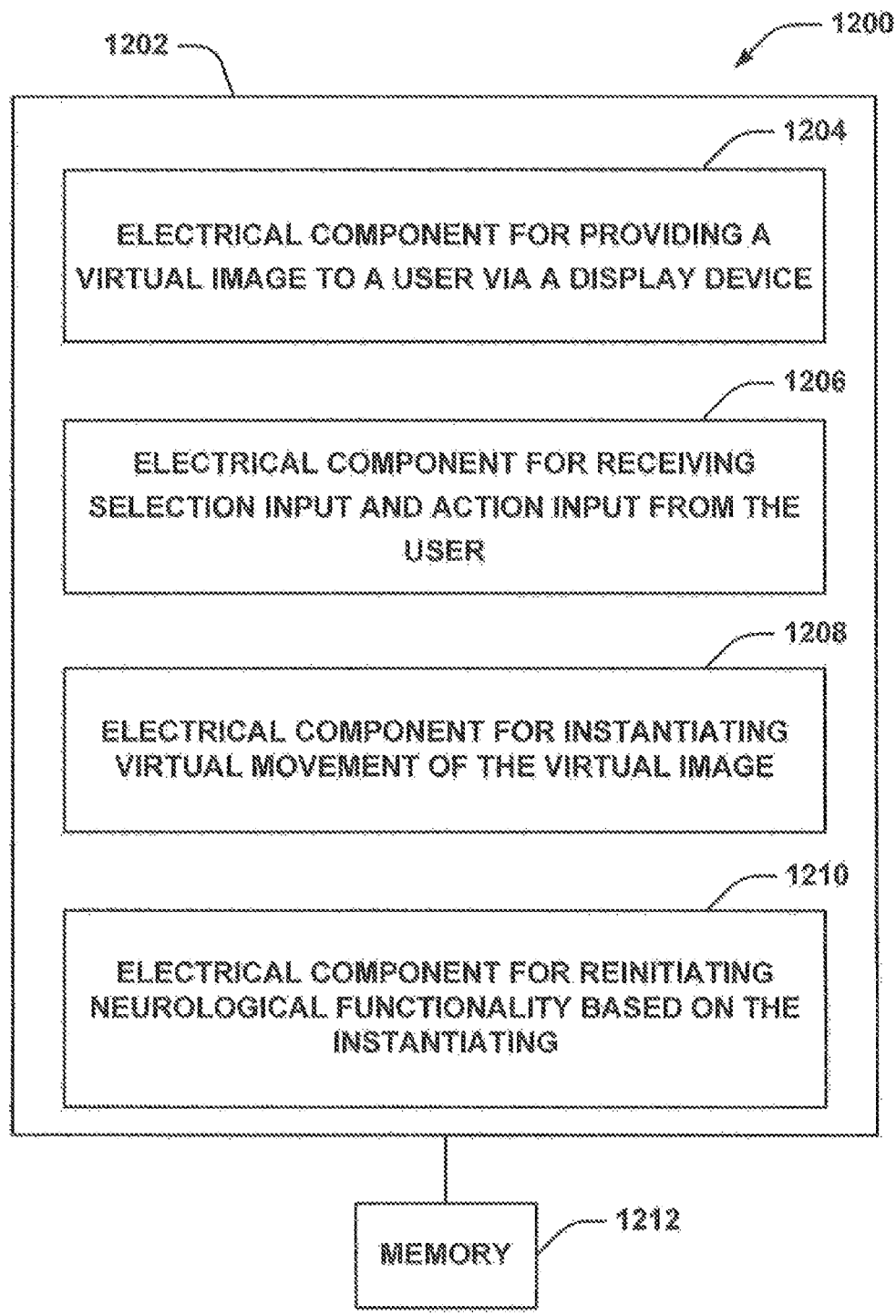
FIG. 12 is a component diagram illustrating an example grouping of electrical components for instantiating kinetic imagery, i.e. embodiments of cortical simulation and reinitiating neurological functionality according to the present disclosure.

Referring to FIG. 12, an example system 1200 is displayed for instantiating virtual movement of a virtual image and reinitiating neurological functionality. For example, system 1200 can reside at least partially within one or more computing or processing devices. It is to be appreciated that system 1200 is represented as including functional blocks, which can be functional blocks that represent processes implemented by a processor, software, or combination thereof (e.g., firmware). System 1200 includes a logical grouping 1202 of electrical components that can act in conjunction. For instance, logical grouping 1202 can include an electrical component 1204 for providing a virtual image to a user via a display device. In addition, logical grouping 1202 can include an electrical component 1206 for receiving a selection input and an action input from the user. In addition, logical grouping 1202 can include an electrical component 1208 for instantiating virtual movement of the virtual image. In addition, logical grouping 1202 can include an electrical component 1210 for reinitiating neurological functionality based on the instantiating. In an aspect, system 1200 may comprise computer device 102 (FIGS. 1 and 2).

Additionally, system 1200 can include a memory 1212 that retains instructions for executing processes associated with the electrical components 1204, 1206, 1208, and 1210, stores data used or obtained by the electrical components 1204, 1206, 1208, and 1210, etc. While shown as being external to memory 1212, it is to be understood that one or more of the electrical components 1204, 1206, 1208, and 1210 can exist within memory 1212. In one example, electrical components 1204, 1206, 1208, and 1210 can comprise at least one processor, or each electrical component 1204, 1206, 1208, and 1210 can be a corresponding module of at least one processor. Moreover, in an additional or alternative example, electrical components 1204, 1206, 1208, and 1210 can be a computer program product including a computer readable medium, where each electrical component 1204, 1206, 1208, and 1210 can be corresponding code.

Figure 13:
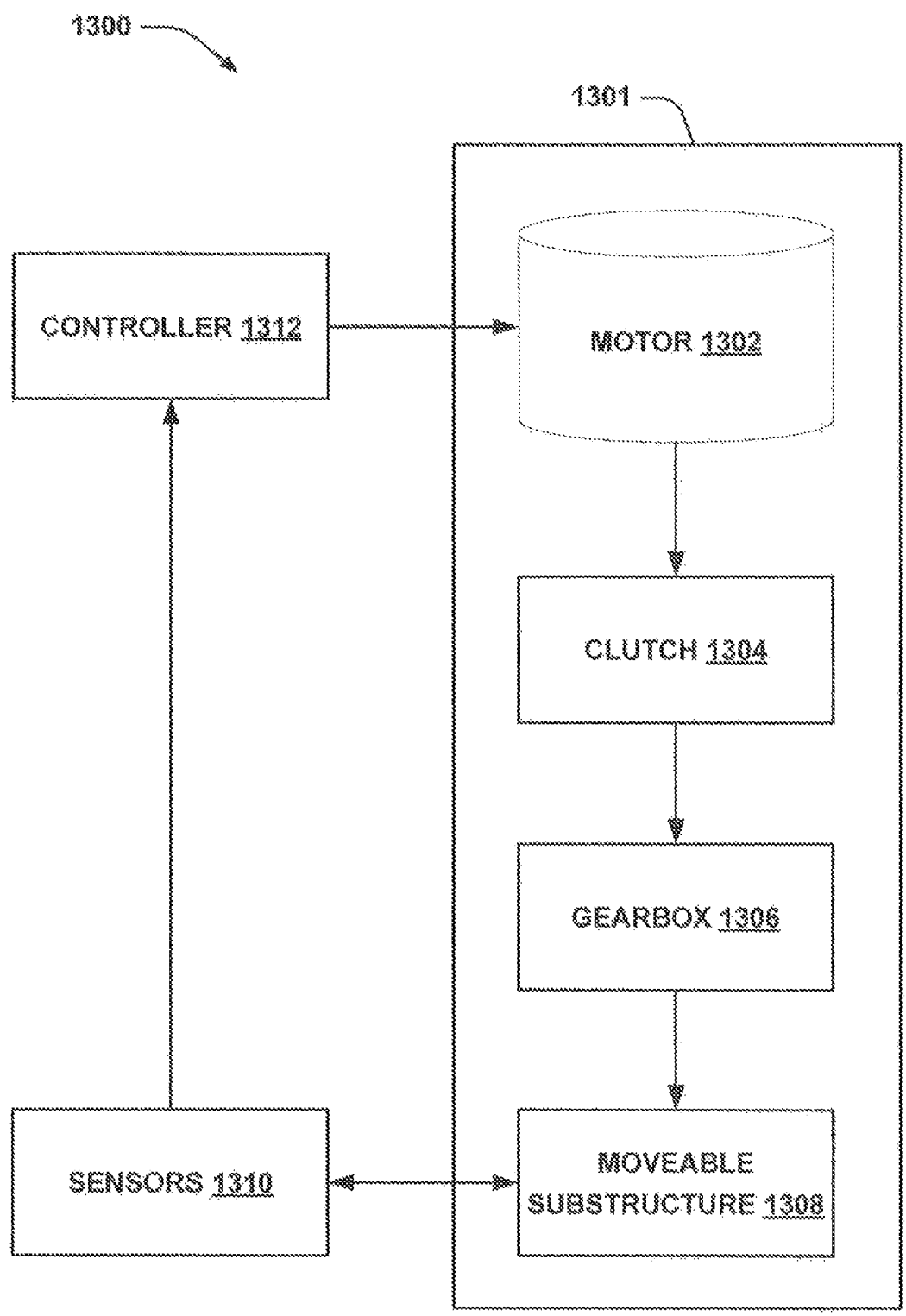
FIG. 13 is a representative drawing a non-virtual robot, prosthesis, or exoskeleton body part according to the present disclosure.

FIG. 13 is a representative drawing of a system 1300, which may include a non-virtual robot 1301, which may be configured to move in response to an input from a user. In an aspect, such input may be a non-corresponding movement input by an input device, such as a mouse, in a manner according to one or more methods provided herein. In an aspect, non-virtual robot 1301 may comprise a prosthesis, exoskeleton, or other motorized device that may physically move in response to one or more inputs or pre-programmed or pre-recoded controls.

Additionally, non-virtual robot 1301 may include a motor 1302, which may be a uni- or bi-directional motor for moving one or more moveable substructures 1308, which may comprise one or more parts of non-virtual robot 1301, such as, but not limited to a finger, limb, head, foot, hand, etc. Some actuator technologies or body part designs may utilize a plurality of motors 1302 (or other actuators) to move the one or more moveable substructures 1308. Further, to create such movement, non-virtual robot 1301 may include a clutch 1304 and/or a gearbox 1306 for controlling aspects of the movement of moveable substructure 1308, such as, but not limited to, speed, force, etc.

Furthermore, system 1300 may include a controller 1312, which may be configured to control motor 1302 and/or any other component of non-virtual robot 1301 based on one or more inputs. In an aspect, these one or more inputs may comprise non-corresponding input from a user and/or a feedback input output by one or more sensors 1310, which may be configured to sense and/or analyze movement of the one or more moveable substructure 1308.

Figure 14:
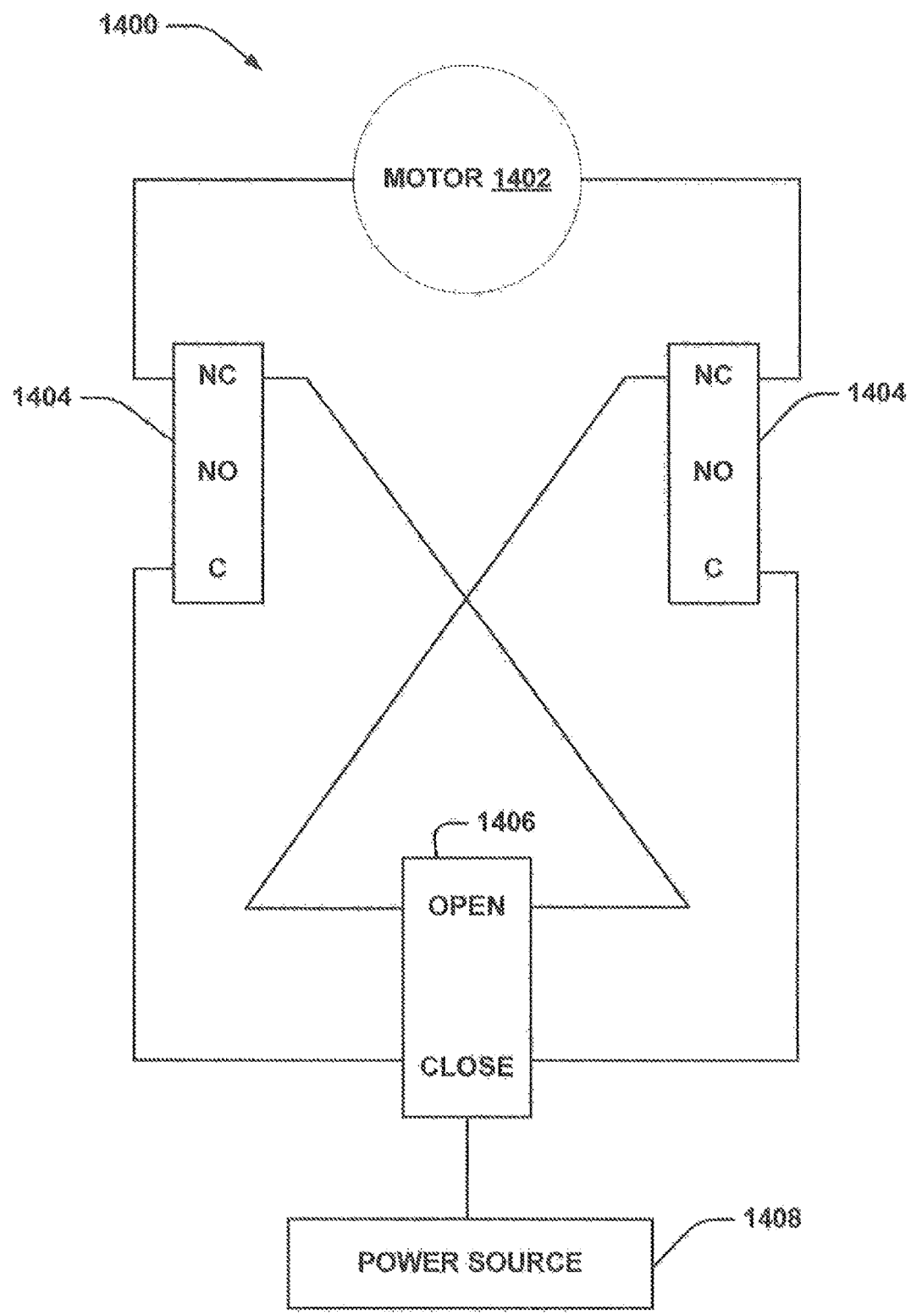
FIG. 14 is a representative wiring diagram of a non-virtual robot according to the present disclosure.

FIG. 14 is a representative wiring diagram of a device 1400, which may comprise a non-virtual robot, prosthesis, or exoskeleton body part, such as, but not limited to, non-virtual robot 1301 of FIG. 13. In an aspect, device 1400 may utilize a manual switch 1406 to engage either of the bi-directional circuits 1404 for controlling a motor 1402, which may be a bi-directional motor. In an aspect, manual switch 1406 may be a three-position Double Pole Double Throw (2P2T) switch for engaging either open or close operation, and which may be center-loaded for neither engagement. Furthermore, device 1400 may include a pair (or more than two) of limit switches 1404 corresponding to two (or more) interleaved circuits (extensor and flexor, i.e. open and close), which may limit motion associated with motor 1402.

Figure 15:
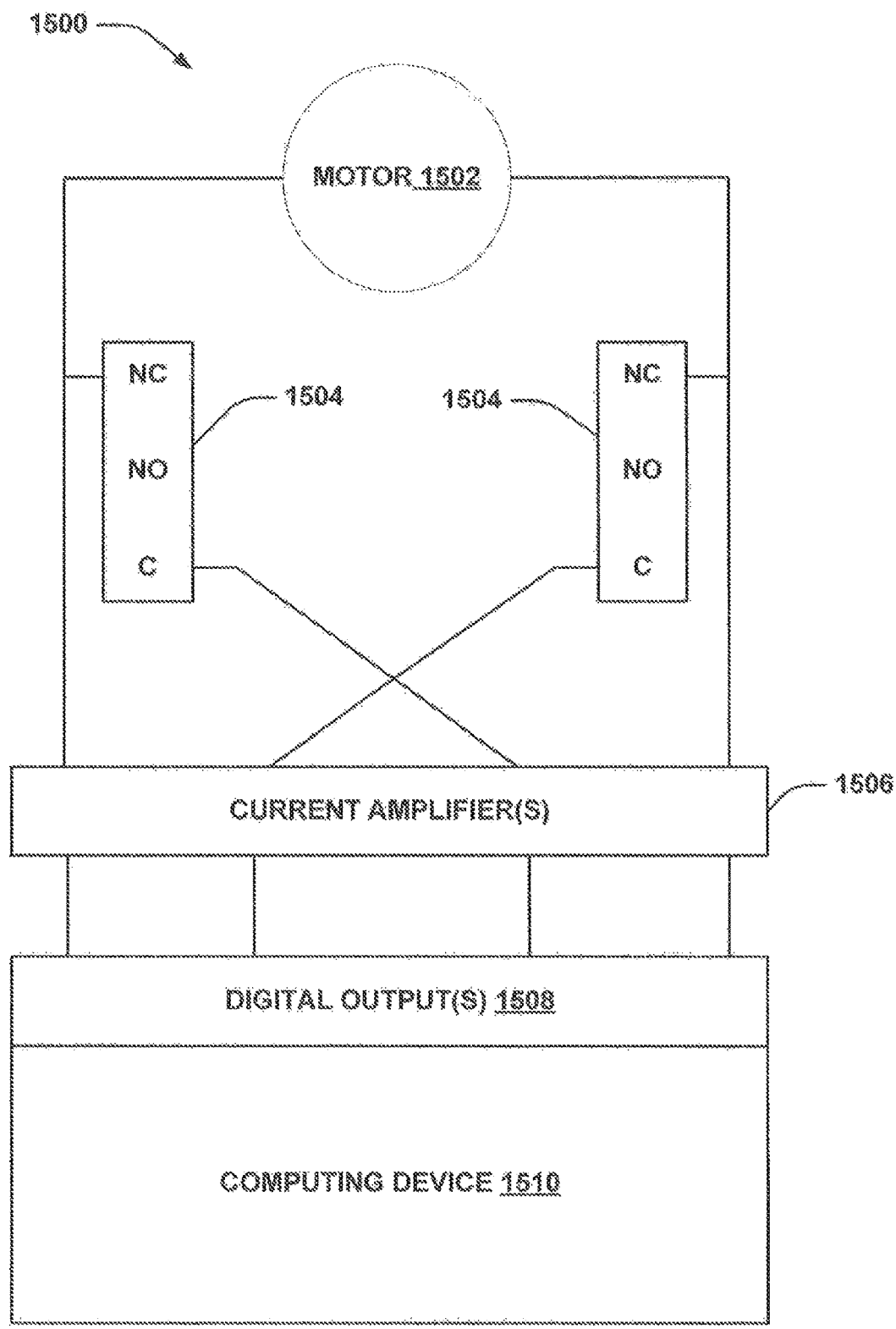
FIG. 15 is a representative wiring diagram of a non-virtual robot according to the present disclosure.

FIG. 15 is a representative wiring diagram of a device 1500, which may be a non-virtual robot, prosthesis, or exoskeleton body part (e.g. of FIGS. 13 and/or 14). In an aspect, device 1500 may operate in response to one or more digital outputs 1508 from a computing device 1510, which may control the movement of device 1500 and the associated motor 1502. For example, the digital outputs 1508 may engage bi-directional circuits, which may incorporate the 2P2T switch circuits present in FIG. 14 (not shown here). Furthermore, current amplifiers 1506 (or voltage amplifiers) may amplify the one or more digital outputs 1508 (or analog outputs) to cause movement via motor 1502. Also, though not shown in FIG. 15, device 1500 may include a plurality of sensors capable of being incorporated which each of one or more body part structures or sub-structures (e.g. moveable substructure 1308 of FIG. 13).

Figure 16:
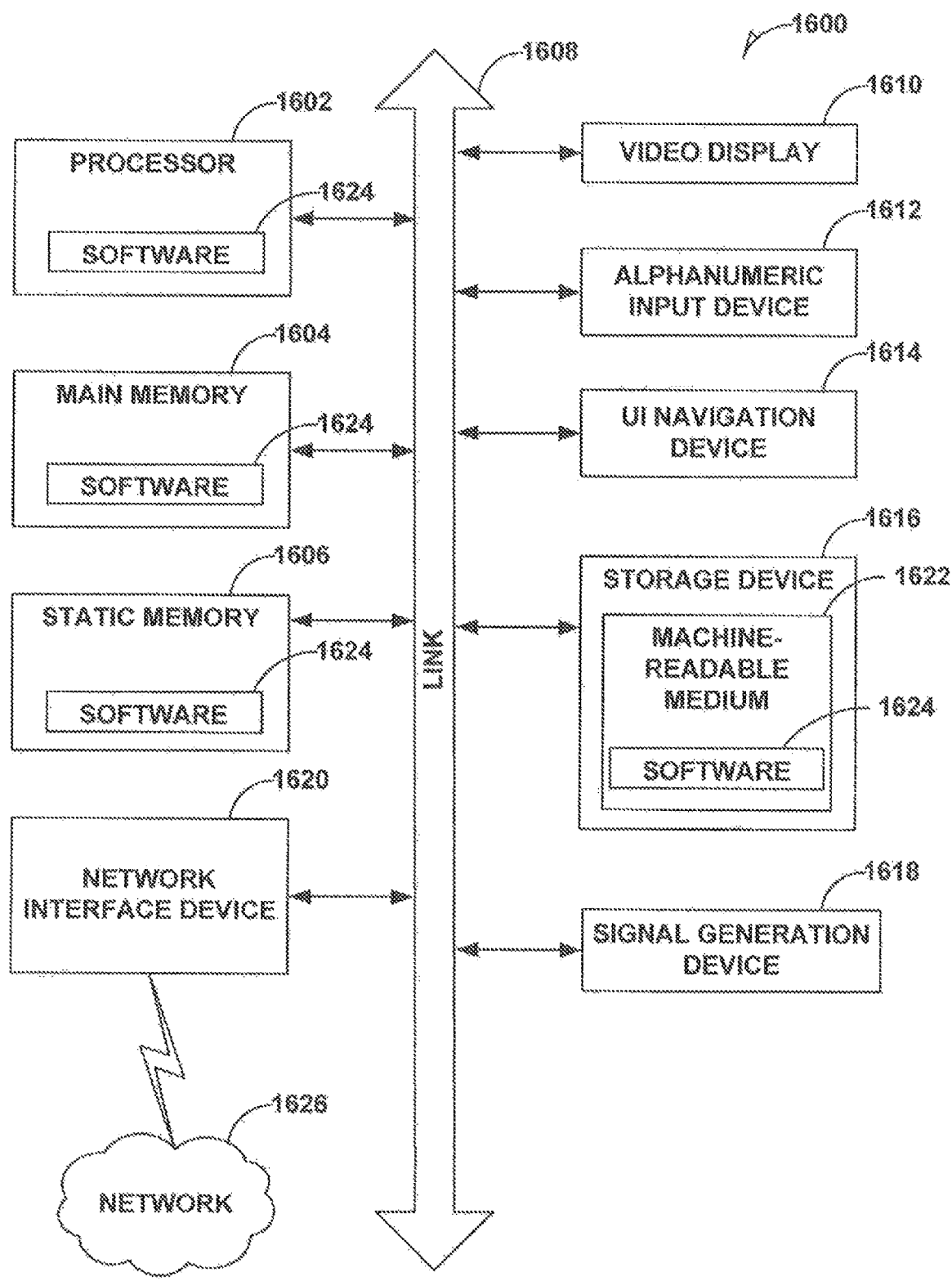
FIG. 16 is a block diagram illustrating a machine in the example form of a computer system according to an example aspect of the present disclosure.

FIG. 16 is a block diagram illustrating a machine in the example form of a computer system 1600, within which a set or sequence of instructions for causing the machine to perform any one of the methodologies discussed herein may be executed, according to an example embodiment. In alternative embodiments, the machine operates as a stand-alone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, a cloud-based computing device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1600 includes at least one processor 1602 (e.g. a central processing unit (CPU), a graphics processing unit (GPU) or both, processor cores, compute nodes, etc.), a main memory 1604 and a static memory 1605, which communicate with each other via a link 1608 (e.g. bus). The computer system 1600 may further include a video display unit 1610, an alphanumeric input device 1612 (e.g. a keyboard), and a user interface (UI) navigation device 1614 (e.g. a mouse). In one embodiment, the video display unit 1610, input device 1612 and UI navigation device 1614 are incorporated into a touch screen display. The computer system 1600 may additionally include a storage device 1615 (e.g. a drive unit), a signal generation device 1618 (e.g. a speaker), a network interface device 1620, and one or more sensors (not shown), such as a global positioning system (GPS) sensor, compass, accelerometer, or other sensor.

The storage device 1615 includes a machine-readable medium 1622 on which is stored one or more sets of data structures and instructions 1624 (e.g. software) embodying or utilized by any one or more of the methodologies or functions described herein. The instructions 1624 may also reside, completely or at least partially, within the main memory 1604, static memory 1605, and/or within the processor 1602 during execution thereof by the computer system 1600, with the main memory 1604, static memory 1605, and the processor 1602 also constituting machine-readable media.

While the machine-readable medium 1622 is illustrated in an example embodiment to be a single medium, the term "machine-readable medium" may include a single medium or multiple media (e.g. a centralized or distributed database, and/or associated caches and servers) that store the one or more instructions 1624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1624 may further be transmitted or received over a communications network 1626 using a transmission medium via the network interface device 1620 utilizing any one of a number of well-known transfer protocols (e.g. HTTP, XML). Examples of communication networks include a local area network (LAN), a wide area network (WAN), the Internet, mobile telephone networks, Plain Old Telephone (POTS) networks, and wireless data networks (e.g. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of modules, modules, or mechanisms. Modules are tangible entities capable of performing specified operations and may be configured or arranged in a certain manner. In an example, circuits may be arranged (e.g. internally or with respect to external entities such as other circuits) in a specified manner as a module. In an example, the whole or part of one or more computer systems (e.g. a standalone, client or server computer system) or one or more hardware processors may be configured by firmware or software (e.g. instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the terms "module" and "module" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which modules are temporarily configured, one instantiation of a module may not exist simultaneously with another instantiation of the same or different module. For example, where the modules comprise a general-purpose hardware processor configured using software, the general-purpose hardware processor may be configured as respective different modules at different times. Accordingly, software may configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

As used in this disclosure, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this disclosure and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the processes described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the processes described may be implemented in hardware, software, firmware, or any combination thereof. If implemented in software, the processes may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

We claim:

1. A method of constructing a user-controllable image in a system for improving performance of a user's body part having an impaired physical action as a result of a brain injury, comprising:
    obtaining anatomical and physiological data representing the body part;
    storing the anatomical and physiological data in a database;
    creating the user-controllable image utilizing the stored anatomical and physiological data, wherein the anatomical and physiological data comprises parameters representing at least one of a plurality of one or more bones, one or more muscles, and one or more tendons;
    configuring the user-controllable image to a user utilizing the parameters, wherein at least a moveable portion of the user-controllable image is constructed to move based on input from the user; and
    directing the user to provide inputs via an input device to the system to select movements of the user-controllable image.

2. The method of claim 1, wherein the user-controllable image comprises an adjacent portion of the user-controllable image adjacent to the moveable portion of the user-controllable image, and wherein the adjacent portion is configured to move as a result of the moveable portion moving.

3. The method of claim 1, further comprising: obtaining at least one default parameter associated with the user-controllable image; obtaining at least one user parameter associated with the user's body part; comparing the at least one default parameter and the at least one user parameter; and configuring the user-controllable image by adjusting one or more of the at least one default parameter when the at least one user parameter differs from the at least one default parameter.

* * * * *